(12) United States Patent
Bhushan et al.

(10) Patent No.: US 10,123,219 B2
(45) Date of Patent: Nov. 6, 2018

(54) PARAMETERIZED SELF-CONTAINED SUBFRAME STRUCTURE HAVING AN INTERLACED PORTION FOLLOWED BY A TAIL PORTION

(71) Applicant: QUALCOMM Incorporated, San Diego, CA (US)

(72) Inventors: Naga Bhushan, San Diego, CA (US); Krishna Kiran Mukkavilli, San Diego, CA (US); Tingfang Ji, San Diego, CA (US); John Edward Smee, San Diego, CA (US); Jing Jiang, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 14/996,902

(22) Filed: Jan. 15, 2016

(65) Prior Publication Data

US 2016/0277944 A1 Sep. 22, 2016

Related U.S. Application Data

(60) Provisional application No. 62/133,862, filed on Mar. 16, 2015.

(51) Int. Cl.
*H04W 4/00* (2018.01)
*H04W 24/02* (2009.01)
(Continued)

(52) U.S. Cl.
CPC .......... *H04W 24/02* (2013.01); *H04L 1/0079* (2013.01); *H04L 1/1854* (2013.01);
(Continued)

(58) Field of Classification Search
None
See application file for complete search history.

(56) References Cited

U.S. PATENT DOCUMENTS 7,515,579 B2 4/2009 Cheng et al.
8,614,977 B2 12/2013 Wu et al.
(Continued)

FOREIGN PATENT DOCUMENTS

EP 2836044 A1 2/2015

OTHER PUBLICATIONS

Dahlmen et al., "Chapter 12: Retransmission Protocols," 4G: LTE/LTE-Advanced for Mobile Broadband (Second Edition), Oct. 2013, pp. 299-319, ISBN: 978-0-12-419985-9, Elsevier Ltd.
(Continued)

*Primary Examiner* — Zewdu A Beyen
(74) *Attorney, Agent, or Firm* — Liem T. Do

(57) ABSTRACT

Techniques are described for wireless communication. A first method includes wirelessly communicating at a first device, with a second device, according to a first subframe structure; receiving a subframe truncation parameter from the second device; and terminating the first subframe structure based at least in part on the subframe truncation parameter. The first subframe structure includes a first periodic sequence of downlink transmission time intervals (TTIs) and uplink TTIs. A second method includes wirelessly communicating at a first device, with a second device, according to a parameterized self-contained subframe structure having an interlaced portion and a tail portion; and reducing a delay indicated by a nominal trigger-response delay parameter associated with a downlink TTI, to enable a response message corresponding to the downlink TTI to be transmitted during the tail portion and before termination of the subframe structure.

27 Claims, 19 Drawing Sheets

(51) Int. Cl.
  *H04W 72/04* (2009.01)
  *H04L 1/00* (2006.01)
  *H04L 1/18* (2006.01)
  *H04L 5/14* (2006.01)
  *H04L 5/00* (2006.01)

(52) U.S. Cl.
  CPC .......... *H04L 5/0044* (2013.01); *H04L 5/0096* (2013.01); *H04L 5/14* (2013.01); *H04L 5/1469* (2013.01); *H04W 72/042* (2013.01); *H04W 72/0413* (2013.01); *H04W 72/0426* (2013.01); *H04W 72/0446* (2013.01); *H04L 5/0007* (2013.01)

(56) References Cited

U.S. PATENT DOCUMENTS 8,756,477 B2  6/2014  Challa et al.
2009/0201838 A1*  8/2009  Zhang ................. H04B 7/2656 370/280
2014/0342745 A1  11/2014  Bhushan et al.
2015/0188650 A1  7/2015  Au et al.

OTHER PUBLICATIONS

ISA/EP, International Search Report and Written Opinion of the International Searching Authority, Int'l Appl. No. PCT/US2016/022511, dated Jun. 23, 2016, European Patent Office, Rijswijk, NL, 12 pgs.

Mediatek Inc., "Discussions on UL HARQ for Rel-13 MTC UE," 3GPP TSG RAN WG1 Meeting #80, Athens, Greece, R1-150675, Feb. 9-13, 2015, 5 pgs., 3rd Generation Partnership Project.

ZTE, "Issues About Data Transmission in TDD-eIMTA," 3GPP TSG RAN WG1 Meeting #73, Fukuoka, Japan, R1-132108, May 20-24, 2013, 4 pgs., 3rd Generation Partnership Project.

* cited by examiner

PARAMETERIZED SELF-CONTAINED SUBFRAME STRUCTURE HAVING AN INTERLACED PORTION FOLLOWED BY A TAIL PORTION

CROSS REFERENCES

The present application for patent claims priority to U.S. Provisional Patent Application No. 62/133,862 by Bhushan et al., entitled "Parameterized Self-Contained Subframe Structure Having an Interlaced Portion Followed by a Tail Portion," filed Mar. 16, 2015, assigned to the assignee hereof, and expressly incorporated by reference herein.

BACKGROUND

Field of the Disclosure

The present disclosure, for example, relates to wireless communication systems, and more particularly to a parameterized self-contained subframe structure having an interlaced portion followed by a tail portion.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems (i.e., systems in different devices transmit different SC-FDM symbol streams over different orthogonal resources), and orthogonal frequency-division multiple access (OFDMA) systems.

By way of example, a wireless multiple-access communication system may include a number of base stations, Wi-Fi access points, mesh schedulers, or the like, each simultaneously supporting communication for multiple communication devices, otherwise known as user equipment (UEs). A base station, Wi-Fi access point, or mesh scheduler may communicate with UEs on downlink channels (e.g., for transmissions from a scheduling device (e.g., a base station, a Wi-Fi access point, or a mesh scheduler) to a scheduled device (e.g., a UE) and uplink channels (e.g., for transmissions from a scheduled device to a scheduling device).

SUMMARY

The present disclosure, for example, relates to wireless communication systems, and more particularly to a parameterized self-contained subframe structure having an interlaced portion followed by a tail portion. Some devices, such as base stations and UEs that communicate using Long-Term Evolution (LTE) or LTE Advanced (LTE-A) communications, may use an interlaced subframe structure in which multiple Hybrid ARQ (HARM) feedback processes may be interlaced. Some devices, such as Wi-Fi access points and Wi-Fi stations that communicate using Wi-Fi communications, may use a one-shot (non-interlaced) subframe structure. The present disclosure describes a parameterized, self-contained subframe structure that may combine aspects of an interlaced subframe structure and a one-shot subframe structure.

In one example, a method of wireless communication at a first device is described. The method may include wirelessly communicating with a second device according to a first subframe structure; receiving a subframe truncation parameter from the second device; and terminating the first subframe structure based at least in part on the subframe truncation parameter. The first subframe structure may include a first periodic sequence of downlink transmission time intervals (TTIs) and uplink TTIs.

In some examples of the method, the subframe truncation parameter may determine a total number of TTIs in the first subframe structure and may partition the total number of TTIs into an interlaced portion and a tail portion. In some examples, the tail portion may include a one-shot portion. In some examples, each downlink TTI of the first periodic sequence may be associated with a nominal trigger-response delay parameter. In some examples, the nominal trigger-response delay parameter associated with a downlink TTI may be a function of a TTI index associated with the downlink TTI.

In some examples, wirelessly communicating with the second device according to the first subframe structure may include receiving a first trigger message from the second device during a first downlink TTI within the interlaced portion, and transmitting to the second device, subsequent to receiving the first trigger message, a first response message associated with the first trigger message. The first response message may be transmitted in an earliest uplink TTI of the first subframe structure that satisfies the nominal trigger-response delay parameter associated with the first downlink TTI. In some examples, wirelessly communicating with the second device according to the first subframe structure may include receiving a second trigger message from the second device during a second downlink TTI within the tail portion, and transmitting to the second device, subsequent to receiving the second trigger message, a second response message associated with the second trigger message. The second response message may be transmitted in a last uplink TTI of the first subframe structure.

In some examples of the method, each uplink TTI of the first periodic sequence may be associated with a nominal response-retrigger delay parameter. In some examples, the nominal response-retrigger delay parameter associated with an uplink TTI may be a function of a TTI index associated with the downlink TTI. In some examples, wirelessly communicating with the second device according to the first subframe structure may include transmitting a first response message to the second device during a first uplink TTI within the interlaced portion, and receiving from the second device, subsequent to transmitting the first response message a first retrigger message associated with the first response message. The first retrigger message is received in a downlink TTI of the first subframe structure that satisfies the nominal response-retrigger delay parameter associated with the first uplink TTI. In some examples, wirelessly communicating with the second device according to the first subframe structure may include transmitting a second response message to the second device during a second uplink TTI within the tail portion, and receiving from the second device, subsequent to transmitting the second response message, a second retrigger message. The second retrigger message may be received in a second subframe structure subsequent to the first subframe structure.

In some examples, the method may include overriding the nominal trigger-response delay parameter or the nominal response-retrigger delay parameter associated with a TTI of the first subframe structure based at least in part on the subframe truncation parameter. In some examples, overriding the nominal trigger-response delay parameter may include reducing a delay indicated by the nominal trigger-response delay parameter to enable transmission of a response message before termination of the first subframe structure.

In some examples of the method, the first periodic sequence of downlink TTIs and uplink TTIs may include a repeating sequence of downlink bursts and uplink bursts, each downlink burst may include a first set of one or more downlink TTIs, and each uplink burst may include a second set of one or more uplink TTIs. In some examples, at least some of the uplink bursts and downlink bursts may be separated by guard-time intervals.

In some examples, the method may include wirelessly communicating with the second device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion.

In some examples, the method may include receiving a number of parameters from the second device. The number of parameters may include at least one of: a first number of TTIs in a downlink burst, or a second number of TTIs in an uplink burst, or a nominal trigger-response delay parameter, or a nominal response-retrigger delay parameter, or a combination thereof. In some examples, a parameter in the number of parameters may be received: semi-statically at a frequency less than once per subframe, or dynamically at a beginning of each subframe.

In some examples, the method may include receiving, semi-statically at a frequency less than once per subframe, a number of parameters defining a configuration of a default subframe structure. The method may also include receiving a bit at a beginning of the first subframe structure indicating whether the first subframe structure follows the configuration of the default subframe structure or a configuration of a predefined one-shot subframe structure.

In some examples, the method may include storing, at the first device, a number of parameters defining two or more subframe structures, and receiving a signal at a beginning of the first subframe structure indicating which of the two or more subframe structures is used for the first subframe structure. In some examples, the method may include storing at least one of the two or more subframe structures in response to at least one of: semi-static signaling received at the first device, or a preconfiguration of the first device, or a combination thereof. In some examples of the method, the subframe truncation parameter may be received during the first subframe structure.

In one example, an downlink apparatus for wireless communication at a first device is described. The apparatus may include means for wirelessly communicating with a second device according to a first subframe structure; means for receiving a subframe truncation parameter from the second device; and means for terminating the first subframe structure based at least in part on the subframe truncation parameter. The first subframe structure may include a first periodic sequence of downlink TTIs and uplink TTIs.

In one example, another apparatus for wireless communication at a first device is described. The apparatus may include a processor and memory coupled to the processor. The processor may be configured to wirelessly communicate with a second device according to a first subframe structure; to receive a subframe truncation parameter from the second device; and to terminate the first subframe structure based at least in part on the subframe truncation parameter. The first subframe structure may include a first periodic sequence of downlink TTIs and uplink TTIs.

In one example, a computer-readable medium for storing instructions executable by a processor is described. The instructions may include instructions to wirelessly communicate with a second device according to a first subframe structure; instructions to receive a subframe truncation parameter from the second device; and instructions to terminate the first subframe structure based at least in part on the subframe truncation parameter. The first subframe structure may include a first periodic sequence of downlink TTIs and uplink TTIs.

In one example, a method of wireless communication at a second device is described. The method may include wirelessly communicating with a first device according to a first subframe structure; transmitting a subframe truncation parameter to the first device; and terminating the first subframe structure based at least in part on the subframe truncation parameter. The first subframe structure may include a first periodic sequence of downlink TTIs and uplink TTIs.

In some examples of the method, the first periodic sequence of downlink TTIs and uplink TTIs may include a repeating sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by guard-time intervals.

In some examples, the method may include wirelessly communicating with the first device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion.

In some examples, the method may include receiving, before terminating the first subframe structure, a transmission of a response message associated with a trigger message transmitted during a TTI of the first subframe structure, where the response message is received with a first trigger-response delay that is reduced compared to a second trigger-response delay indicated by a nominal trigger-response delay parameter associated with the TTI. In some examples, the subframe truncation parameter may determine a total number of TTIs in the first subframe structure and may partition the total number of TTIs into an interlaced portion and a tail portion. In some examples, the tail portion may include a one-shot portion. In some examples, the method may include transmitting a number of parameters to the first device, where the number of parameters includes at least one of: a first number of TTIs in a downlink burst, or a second number of TTIs in an uplink burst, or a nominal trigger-response delay parameter, or a nominal response-retrigger delay parameter, or a combination thereof. In some examples, a parameter in the number of parameters may be transmitted: semi-statically at a frequency less than once per subframe, or dynamically at a beginning of each subframe.

In some examples of the method, the subframe truncation parameter may be transmitted during the first subframe structure. In some examples, the subframe truncation parameter may be transmitted: during a predetermined TTI of the first subframe structure, or during a dynamically determined TTI of the first subframe structure, which dynamically determined TTI occurs before commencing terminating the first subframe structure. In some examples, the method may include dynamically determining a value of the subframe truncation parameter based on at least one of: a traffic type, or a first bandwidth of the first device, or a second bandwidth associated with traffic for the first device, or a memory constraint, or a packet size, or an indicated service level, or a combination thereof. Wireless communications between the first device and the second device may be scheduled by the second device.

In one example, another apparatus for wireless communication at a second device is described. The apparatus may include means for wirelessly communicating with a first device according to a first subframe structure; means for transmitting a subframe truncation parameter to the first device; and means for terminating the first subframe structure based at least in part on the subframe truncation parameter. The first subframe structure may include a first periodic sequence of downlink TTIs and uplink TTIs.

In one example, another apparatus for wireless communication at a second device is described. The apparatus may include a processor and memory coupled to the processor. The processor may be configured to wirelessly communicate with a first device according to a first subframe structure; to transmit a subframe truncation parameter to the first device; and to terminate the first subframe structure based at least in part on the subframe truncation parameter. The first subframe structure may include a first periodic sequence of downlink TTIs and uplink TTIs.

In one example, another computer-readable medium for storing instructions executable by a processor is described. The instructions may include instructions to wirelessly communicate with a first device according to a first subframe structure; instructions to transmit a subframe truncation parameter to the first device; and instructions to terminate the first subframe structure based at least in part on the subframe truncation parameter. The first subframe structure may include a first periodic sequence of downlink TTIs and uplink TTIs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a parameterized self-contained subframe structure having an interlaced portion followed by a tail portion is used for communication between scheduling devices (e.g., base stations, Wi-Fi access points, and mesh schedulers) and scheduled devices (e.g., UEs). A parameterized self-contained subframe structure can be useful in that it provides a common subframe structure in which subframe structures used by LTE/LTE-A devices and Wi-Fi devices may be realized. The interlaced portion of the subframe structure may enable low switching overhead for medium latency traffic, while the tail portion of the subframe structure may provide low latency and lower HARQ buffer requirements. In the tail portion, a trigger-response delay associated with a downlink TTI may be reduced relative to a nominal trigger-response delay that would otherwise be used if the downlink TTI were to occur during the interlaced portion. The reduced trigger-delay response enables a response message corresponding to a trigger message transmitted during (or before) the tail portion to be transmitted before termination of the parameterized, self-contained subframe structure.

A network (e.g., an LTE/LTE-A network) may start with the interlaced-portion of the subframe structure while serving bulk data with medium data rate and medium latency requirements, but terminate the subframe structure with the tail portion (e.g., a one-shot portion) as soon as low-latency traffic (e.g., mission-critical data packets, or tactile user-experience packets) or very large data packets arrive (destined for receivers with high throughput, memory-constrained decoders). Following termination of the parameterized, self-contained subframe structure, the network may switch to using one-shot subframe structures until the low-latency traffic or very large data packets have been delivered. The network may then switch back to a parameterized, self-contained subframe structure having an interlaced portion of indeterminate duration. In other words, a parameterized, self-contained subframe structure may provide a unified framework for catering to highly diverse traffic types and service requirements, without changing the underlying MAC protocol.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
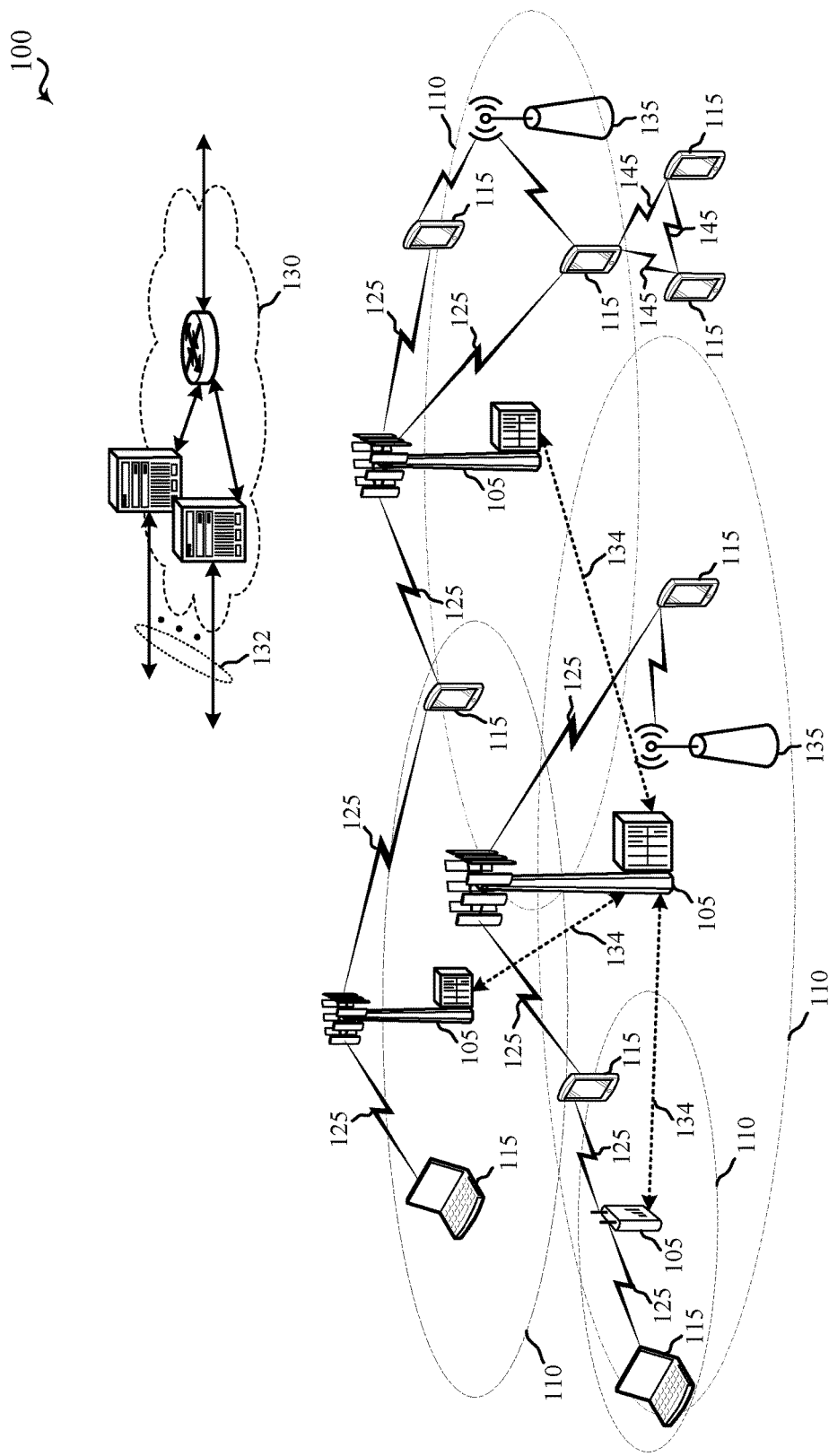
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

As shown in FIG. 1, the wireless communication system 100 may also or alternatively include one or more WLAN access points, such as Wi-Fi access points 135 that transmit data to, and receive data from, one or more of the UEs 115 (e.g., UEs 115 configurable as Wi-Fi stations). The wireless communication system 100 may also include one or more mesh networks, as indicated by the communication links 145 between certain UEs 115. More generally, the wireless communication system 100 may include a number of scheduling devices (e.g., base stations 105, Wi-Fi access points 135, or mess schedulers (which may be a UE 115)) and a number of scheduled devices. Typically, the UEs 115 will be scheduled devices, though this does not have to be the case. When referring to communications between devices in the present disclosure, transmissions from a scheduling device to a scheduled device are referred to as downlink transmission, and transmissions from a scheduled device to a scheduling device are referred to as uplink transmissions.

Figure 2:
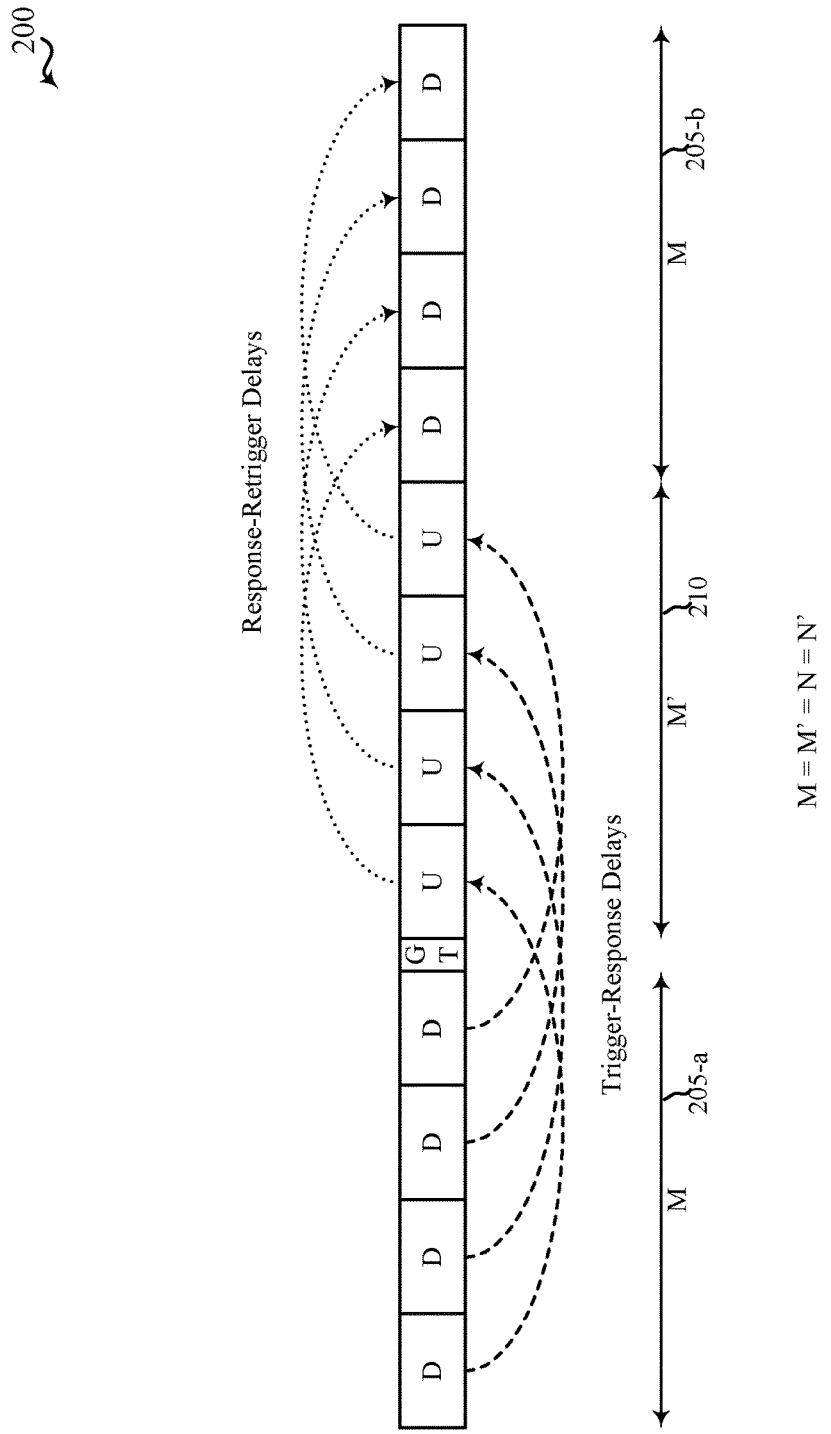
FIG. 2 shows an exemplary uniform interlaced subframe structure that may be used for wireless communication, in accordance with various aspects of the present disclosure.

FIG. 2 shows an exemplary uniform interlaced subframe structure 200 that may be used for wireless communication, in accordance with various aspects of the present disclosure. In some examples, the subframe structure 200 may be used for communications between base stations and UEs (e.g., between the base stations 105 and UEs 115 described with reference to FIG. 1), or more generally between scheduling devices and scheduled devices.

By way of example, the subframe structure 200 is shown to include a periodic sequence of downlink (D) transmission time intervals (TTIs) and uplink (U) TTIs. The periodic sequence of downlink TTIs and uplink TTIs may include a repeating sequence of downlink bursts 205 and uplink bursts 210, where each downlink burst 205 includes a set of one or more downlink TTIs and each uplink burst 210 includes a set of one or more uplink TTIs. Each set of one or more downlink TTIs may include M TTIs, where M is an integer greater than one. Each set of one or more uplink TTIs may include M' TTIs, where M' is also an integer greater than one. A guard-time (GT) interval (TDD or FDD) may or may not be provided between a downlink burst 205 of M TTIs and an uplink burst 210 of M' TTIs. Although the subframe structure 200 is shown to have twelve TTIs divided among a first downlink burst 205-$a$, an uplink burst 210, and a second downlink burst 205-$b$, the subframe structure 200 may include any number of TTIs and any number of downlink bursts 205 and uplink bursts 210.

Packet scheduling and HARQ feedback processing may be incorporated into the subframe structure 200 as follows. A trigger message may be transmitted by a base station during a downlink TTI in a downlink burst 205 of M TTIs. A UE that receives the trigger message may respond by transmitting a first response message during an uplink TTI in a subsequent uplink burst 210 of M' TTIs. The response message may be transmitted after a trigger-response delay of N TTIs (i.e., the response message may be transmitted in an earliest uplink TTI occurring at least N TTIs after the downlink TTI in which the trigger message was transmitted/received). In response to receiving the response message, the base station may transmit to the UE a first retrigger message during a downlink TTI in a subsequent downlink burst 210 of M TTIs. The retrigger message may be transmitted after a response-trigger delay of N' TTIs (i.e., the retrigger message may be transmitted in a downlink TTI occurring N' TTIs after the uplink TTI in which the response message was transmitted/received). The UE may then respond by transmitting a second response message, and so on. In the present disclosure, references to a trigger message may be considered to include a reference to a retrigger message, and vice versa.

Every downlink TTI in a downlink burst 205 of M TTIs may be associated with the same value of N, and every uplink TTI in an uplink burst 210 of M' TTIs may be associated with the same value of N', with M=M'=N=N' providing the uniformity in the uniform interlaced subframe structure 200.

Figure 3:
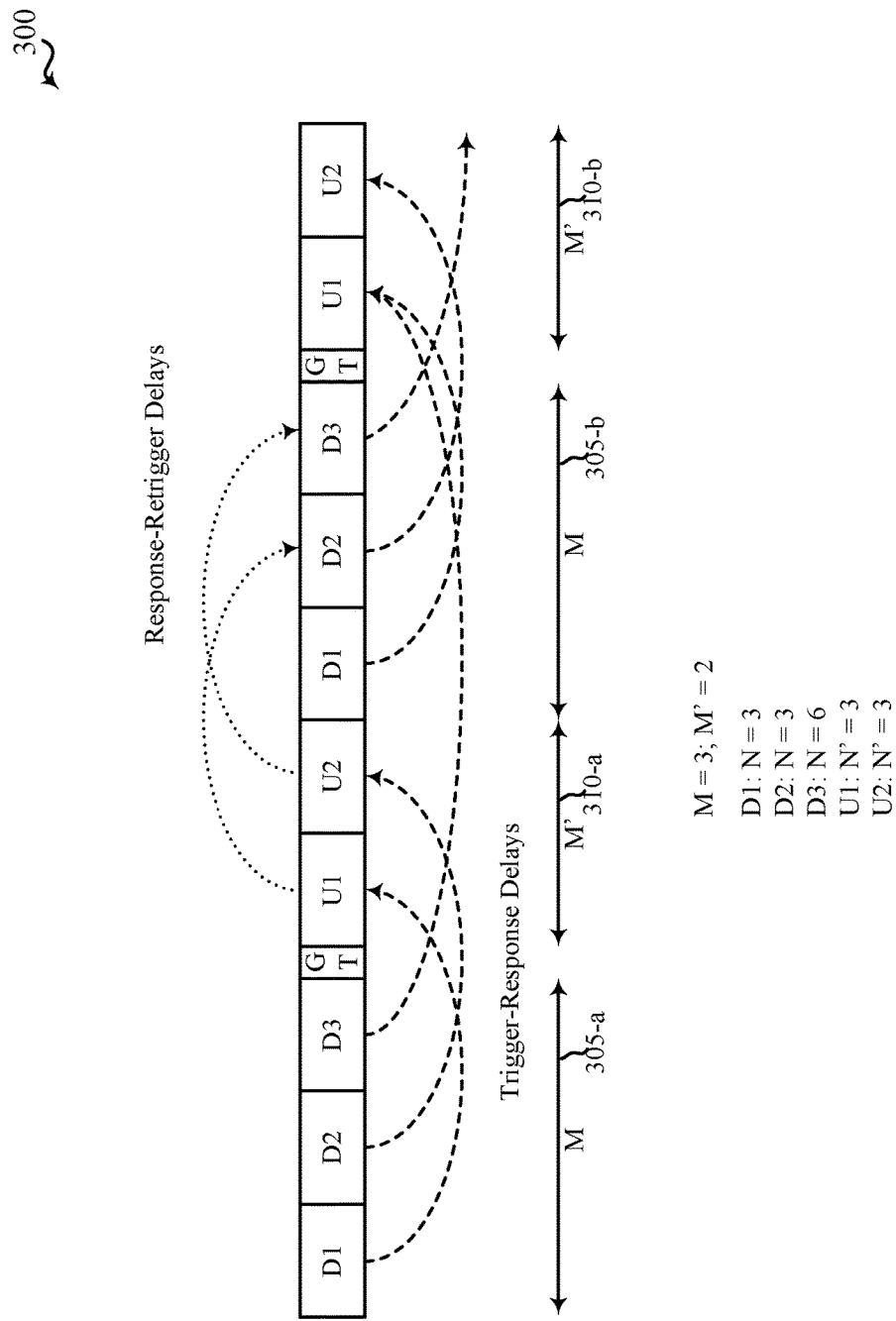
FIG. 3 shows an exemplary non-uniform interlaced subframe structure that may be used for wireless communication, in accordance with various aspects of the present disclosure.

FIG. 3 shows an exemplary non-uniform interlaced subframe structure 300 that may be used for wireless communication, in accordance with various aspects of the present disclosure. In some examples, the subframe structure 300 may be used for communications between base stations and UEs (e.g., between the base stations 105 and UEs 115 described with reference to FIG. 1), or more generally between scheduling devices and scheduled devices.

By way of example, the subframe structure 300 is shown to include a periodic sequence of downlink (D) transmission time intervals (TTIs) and uplink (U) TTIs. The periodic sequence of downlink TTIs and uplink TTIs may include a repeating sequence of downlink bursts 305 and uplink bursts 310, where each downlink burst 305 includes a set of one or more downlink TTIs and each uplink burst 310 includes a set of one or more uplink TTIs. Each set of one or more downlink TTIs may include M TTIs, where M is an integer greater than one. Each set of one or more uplink TTIs may include M' TTIs, where M' is also an integer greater than one. A GT interval (TDD or FDD) may or may not be provided between a downlink burst 305 of M TTIs and an uplink burst 310 of M' TTIs. Although the subframe structure 300 is shown to have ten TTIs divided among a first downlink burst 305-a, a first uplink burst 310-a, a second downlink burst 305-b, and a second uplink burst 310-b, the subframe structure 300 may include any number of TTIs and any number of downlink bursts 305 and uplink bursts 310.

Packet scheduling and HARQ feedback processing may be incorporated into the subframe structure 300 as follows. A trigger message may be transmitted by a base station during a downlink TTI in a downlink burst 305 of M TTIs. A UE that receives the trigger message may respond by transmitting a first response message during an uplink TTI in a subsequent uplink burst 310 of M' TTIs. The response message may be transmitted after a trigger-response delay of N TTIs (i.e., the response message may be transmitted in an earliest uplink TTI occurring at least N TTIs after the downlink TTI in which the trigger message was transmitted/received). In response to receiving the response message, the base station may transmit to the UE a first retrigger message during a downlink TTI in a subsequent downlink burst 305 of M TTIs. The retrigger message may be transmitted after a response-trigger delay of N' TTIs (i.e., the retrigger message may be transmitted in a downlink TTI occurring N' TTIs after the uplink TTI in which the response message was transmitted/received). The UE may then respond by transmitting a second response message, and so on.

Downlink TTIs in a downlink burst 305 of M TTIs may be associated with the same or different values of N, and uplink TTI in an uplink burst 310 of M' TTIs may be associated with the same or different values of N', with $N+N' \geq M+M'$ for each HARQ feedback process, and with allowed variability in the individual values of M, M', N, and N' providing the non-uniformity in the non-uniform interlaced subframe structure 300.

In some exemplary uses of the subframe structure 200 or the subframe structure 300, the trigger message may include a first data transmission (e.g., a first data packet), in which case the first response message may include acknowledgement or non-acknowledgement (ACK/NACK) feedback, and the retrigger message may include a second data transmission (e.g., an incremental redundancy version (RV) corresponding to the first data transmission, or a repetition of the first data transmission (e.g., in response to NACK feedback), or a second data packet (e.g., in response to ACK feedback). As an alternative example, the trigger message may include a first uplink resource grant, the first response message may include a data packet, and the retrigger message may include either a retransmission request or a second uplink resource grant.

In each of the subframe structure 200 and the subframe structure 300, the configuration of TTIs and inter-relationships among trigger messages, response messages, and retrigger messages leads to a retransmission delay of N+N' TTIs (plus GT interval delay, if any), and up to N+N' active HARQ feedback process interlaces. LTE/LTE-A communications use such a subframe structure. For example, LTE/LTE-A FDD communication is an example of communication using a uniform interlace subframe structure with M=M'=N=N'=4 for all TTIs (leading to a uniform interlace subframe structure with eight HARQ feedback process interlaces). On the other hand, LTE/LTE-A TDD communication is an example of communication using a non-uniform interlace subframe structure, with different LTE/LTE-A TDD configurations each having a unique combination of M and M' values, with M+M'=5 TTIs or M+M'=10 TTIs for each configuration. Furthermore, within each LTE/LTE-A TDD configuration, each downlink TTI may be associated with its own combination of N and N' values, with N>3, N'>3, and N+N'=10 for each LTE/LTE-A TDD configuration. In other words, LTE/LTE-A TDD communication uses a non-uniform/irregular subframe structure with a retransmission latency of 10 TTIs, and 10 HARQ feedback process interlaces.

An interlaced subframe structure (e.g., a uniform interlaced subframe structure or a non-uniform interlaced subframe structure) can be useful in that an interlaced subframe structure provides a receiving apparatus N or N' TTIs to process a resource grant or decode a data packet, which may lead to savings in decoder cost, size, or complexity. Also, in a TDD mode, use of an interlaced subframe structure provides just two switches in transmit/receive direction every N+N' interlaces. This switching overhead may be minimized by choosing a sufficiently large value of M+M', which implies a correspondingly large value of N+N'. However, in a HARQ-based system, a receiving apparatus may have to maintain buffers for up to $N+N' \geq M+M'$ data packets that have been partially received. Also, the retransmission latency of N+N' may be too great for some applications (e.g., mission-critical applications or tactile user-experience applications).

Figure 4:
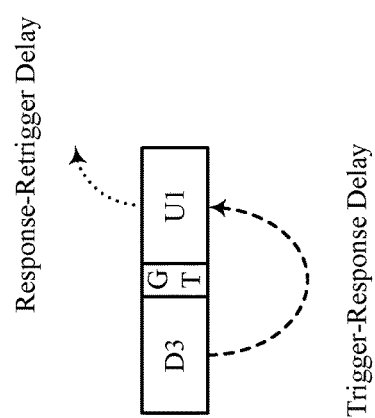
FIG. 4 shows an exemplary one-shot subframe structure that may be used for wireless communication, in accordance with various aspects of the present disclosure.

FIG. 4 shows an exemplary one-shot subframe structure 400 that may be used for wireless communication, in accordance with various aspects of the present disclosure. In some examples, the subframe structure 400 may be used for communications between Wi-Fi access points and UEs (e.g., between the Wi-Fi access points 135 and UEs 115 described with reference to FIG. 1), or more generally between scheduling devices and scheduled devices.

By way of example, the subframe structure 400 is shown to include a single downlink (D) TTI and a single uplink (U) TTI. A Wi-Fi access point may transmit a trigger message during the downlink TTI, and a UE that receives the trigger message may respond by transmitting a response message during the uplink TTI. If the response message indicates that the decoding of a data packet included in the trigger message was unsuccessful, a retransmission (e.g., an incremental RV corresponding to the data packet, or a repetition of the data packet) may occur during a downlink TTI of a next one-shot subframe structure. The timing relationship between a current subframe structure and a subsequent subframe structure may not be specified. Thus, asynchronous HARQ may be used. A one-shot subframe structure may be used for TDD communication, and hence, a GT interval may be included between the downlink TTI and the uplink TTI, to account for transceiver switching times and round-trip propagation delay, and to also account for baseband processing/decoding delays.

A one-shot subframe structure can be useful in that it reduces the buffer requirements and retransmission latency associated with an interlaced subframe structure. However, it may do so at the expense of a fast decoder associated with a greater cost, size, or complexity, and higher switching overhead (e.g., a GT interval occurring once every couple TTIs).

Figure 5:
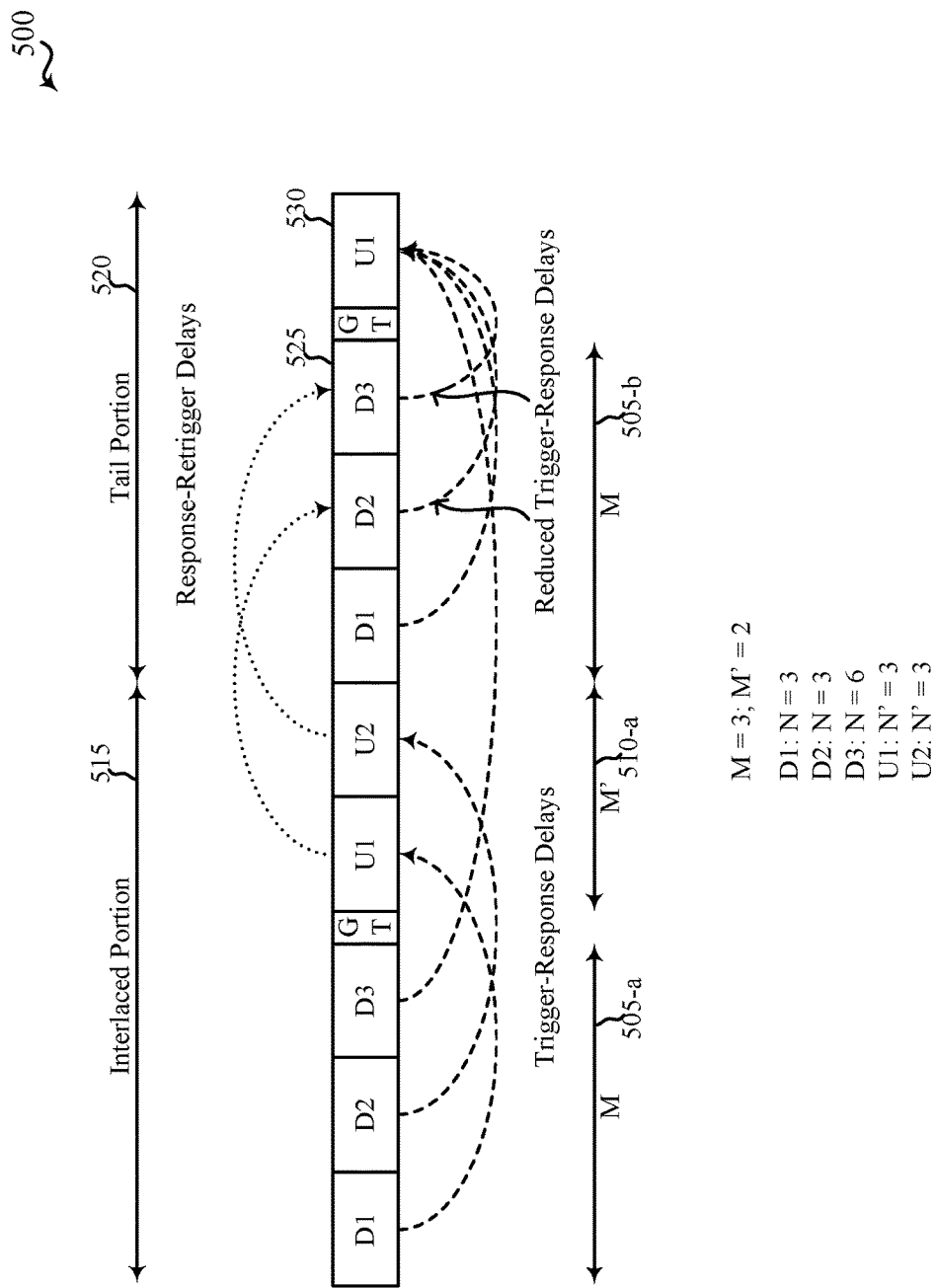
FIG. 5 shows an exemplary parameterized self-contained subframe structure that may be used for wireless communication, in accordance with various aspects of the present disclosure.

FIG. 5 shows an exemplary parameterized self-contained subframe structure 500 that may be used for wireless communication, in accordance with various aspects of the present disclosure. The subframe structure 500 includes an interlaced portion 515 having aspects of the uniform interlaced subframe structure 200 or non-uniform interlaced subframe structure 300 described with reference to FIG. 2 or 3, and a tail portion 520. The tail portion 520 may incorporate aspects of the one-shot subframe structure 400 described with reference to FIG. 4. In some examples, the subframe structure 500 may be used for communications between any of the scheduling devices (e.g., base stations 105, Wi-Fi access points 135, or mesh network schedulers) and UEs 115 described with reference to FIG. 1.

By way of example, the interlaced portion of the subframe structure 500 is shown to include a periodic sequence of downlink (D) TTIs and uplink (U) TTIs. The periodic sequence of downlink TTIs and uplink TTIs may include a repeating sequence of downlink bursts 505 and uplink bursts 510, where each downlink burst 505 includes a set of one or more downlink TTIs and each uplink burst 510 includes a set of one or more uplink TTIs. Each set of one or more downlink TTIs may include M TTIs, where M is an integer greater than one. Each set of one or more uplink TTIs may include M' TTIs, where M' is also an integer greater than one. A GT interval (TDD or FDD) may or may not be provided between a downlink burst 505 of M TTIs and an uplink burst 510 of M' TTIs. Although the interlaced portion 515 of the subframe structure 500 is shown to have five TTIs divided among a first downlink burst 505-$a$ and a first uplink burst 510-$a$, the interlaced portion 515 of the subframe structure 500 may include any number of TTIs and any number of downlink bursts 505 and uplink bursts 510.

Packet scheduling and HARQ feedback processing may be incorporated into the interlaced portion of the subframe structure 500 as follows. A trigger message may be transmitted by a base station during a downlink TTI in a downlink burst 505 of M TTIs. A UE that receives a trigger message may respond by transmitting a first response message during an uplink TTI in a subsequent uplink burst 510 of M' TTIs. The response message may be transmitted after a nominal trigger-response delay of N TTIs (i.e., the response message may be transmitted in an earliest uplink TTI occurring at least N TTIs after the downlink TTI in which the trigger message was transmitted/received). In response to receiving the response message, the base station may transmit to the UE a first retrigger message during a downlink TTI in a subsequent downlink burst 505 (e.g., in downlink burst 505-$b$) of M TTIs. The retrigger message may be transmitted after a nominal response-trigger delay of N' TTIs (i.e., the retrigger message may be transmitted in a downlink TTI occurring N' TTIs after the uplink TTI in which the response message was transmitted/received). The UE may then respond by transmitting a second response message, and so on.

Downlink TTIs in a downlink burst 505 of M TTIs may be associated with the same or different values of N, and uplink TTI in an uplink burst 510 of M' TTIs may be associated with the same or different values of N', with $N+N' \geq M+M'$ for each HARQ feedback process.

The tail portion 520 of the subframe structure 500 may be defined at least in part by a subframe truncation parameter. In some examples, the subframe truncation parameter may determine a total number of TTIs (T) in the subframe structure 500, and may (inherently or implicitly) partition the total number of TTIs into the interlaced portion 515 and the tail portion 520. In some examples, a value of the subframe truncation parameter may be dynamically determined by a scheduling device. In some examples, the value of the subframe truncation parameter may be based on at least one of: a traffic type (e.g., a type of downlink traffic or uplink traffic), or a bandwidth of a scheduled device, or a bandwidth associated with traffic for the scheduled device, or a memory constraint (of the scheduling device or the scheduled device), or a packet size (of downlink traffic or uplink traffic), or an indicated service level (for downlink traffic or uplink traffic), or a combination thereof. In some examples, the subframe truncation parameter may be transmitted from a scheduling device to a scheduled device during the subframe structure 500. In some examples, the subframe truncation parameter may be transmitted during a dynamically determined TTI of the subframe structure 500, which dynamically determined TTI occurs before commencing termination of the subframe structure 500 (e.g., before or at the beginning of the tail portion 520). In some examples, the subframe truncation parameter may be transmitted during a predetermined TTI of the subframe structure 500.

In some examples, a value of the subframe truncation parameter may be selected such that the subframe structure 500 has a total number of TTIs (T) extending partially into an uplink burst of M' TTIs (e.g., one or two TTIs into the uplink burst). When the value of the subframe truncation parameter is selected such that the subframe structure 500 terminates one uplink TTI into an uplink burst of M' TTIs, the final downlink TTI 525 and final uplink TTI 530 of the subframe structure 500 assume the form a one-shot portion of the subframe structure 500.

Packet scheduling and HARQ feedback processing may be incorporated into the tail portion 520 of the subframe structure 500 similarly to how HARQ feedback processing may be incorporated into the interlaced portion 515 of the subframe structure 500. However, for a response message triggered in response to a trigger message received during a downlink TTI of the tail portion 520 (or received during any downlink TTI for which a response message has yet to be transmitted), the trigger-response delay associated with the downlink TTI may be reduced relative to the nominal trigger-response delay (as followed in the interlaced portion 515), to enable transmission of a response message during (or before) a last uplink TTI 530 of the subframe structure 500. For a response message transmitted during the tail portion 520 (or last partial burst of uplink TTIs), a retrigger message may be received in a subsequent subframe structure.

In some examples, a trigger message transmitted during a downlink TTI of the tail portion 520 may be modified so that a scheduled device may react with a less-than-usual latency (i.e., less than N TTIs). This may be achieved, in some examples, by limiting a packet size of a data transmission included in the trigger message.

In some examples, the parameters (e.g., M, M', N, and N') of the interlaced portion 515 of the subframe structure 500 may be received by a scheduled device during a preconfiguration of the scheduled device; semi-statically as the scheduled device wirelessly communicates with a scheduling device, at a frequency less than once per subframe structure; or dynamically during each subframe structure (e.g., in the first few TTIs of each subframe structure). In some examples, a number of parameters stored at a scheduled device may define a configuration of a default subframe structure, and a scheduling device may dynamically indicate whether a current or next subframe structure follows the configuration of the default subframe structure. In some examples, the default subframe structure may be a parameterized self-contained subframe structure such as the subframe structure 500. In some examples, a number of parameters stored at a scheduled device may define two or more subframe structures, such as a parameterized self-contained subframe structure and a one-shot subframe structure, and a scheduling device may dynamically indicate which of the two or more subframe structures a current or next subframe structure follows.

In some examples, the subframe truncation parameter for the subframe structure 500 may be transmitted to (and received by) a scheduled device semi-statically (e.g., used for multiple subframe structures) or dynamically (e.g., during the subframe structure 500). In some examples, the subframe truncation parameter may be received during a dynamically determined TTI of the subframe structure 500, which dynamically determined TTI occurs before or at the beginning of the tail portion 520 of the subframe structure 500. In other examples, the subframe truncation parameter may be received during a predetermined TTI of the subframe structure 500.

The subframe structure 500 may be configured as a pure interlaced subframe structure or as a one-shot subframe structure in certain cases. For example, a pure interlaced subframe structure may be defined by specifying only the M, M', N, and N' parameters associated with the interlaced portion 515 and either 1) not specifying a subframe truncation parameter, or 2) setting the value of the subframe truncation parameter to infinity. A one-shot subframe structure may be defined by setting M'=1 and setting T=M+1 (for any M≥1). Other parameter settings result in a subframe structure 500 that behaves like an interlaced subframe structure in the beginning, and like a one-shot subframe structure at the end. With any selection of parameters, the subframe structure 500 is "self-contained" within its total number of T TTIs, thus retaining a property of one-shot subframe structures.

A parameterized self-contained subframe structure can be useful in that it provides a common subframe structure in which subframe structures used by LTE/LTE-A devices and Wi-Fi devices may be realized. The interlaced portion of the subframe structure may enable low switching overhead for medium latency traffic, while the one-shot portion of the subframe structure may provide low latency and lower HARQ buffer requirements. Hence, a network (e.g., an LTE/LTE-A network) may start with the interlaced-portion of the subframe structure while serving bulk data with medium data rate and medium latency requirements, but terminate the subframe structure with a one-shot portion as soon as low-latency traffic (e.g., mission-critical data packets, or tactile user-experience packets) or very large data packets arrive (destined for receivers with high throughput, memory-constrained decoders). Following termination of the parameterized, self-contained subframe structure, the network may switch to using one-shot subframe structures until the low-latency traffic or very large data packets have been delivered. The network may then switch back to a parameterized, self-contained subframe structure having an interlaced portion of indeterminate duration. In other words, a parameterized, self-contained subframe structure may provide a unified framework for catering to highly diverse traffic types and service requirements, without changing the underlying MAC protocol.

Figure 6:
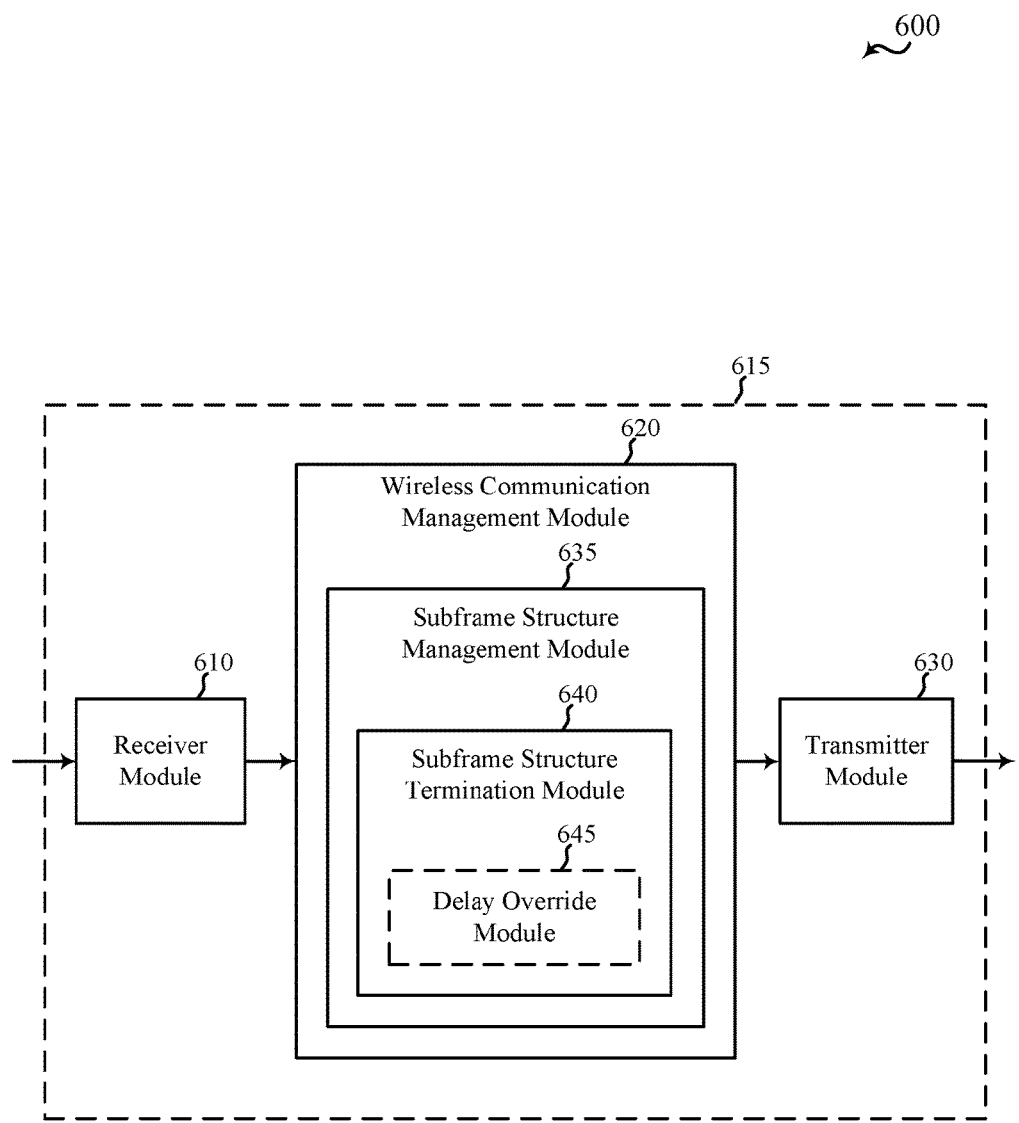
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115 described with reference to FIG. 1. The apparatus 615 may also be or include a processor. The apparatus 615 may include a receiver module 610, a wireless communication management module 620, or a transmitter module 630. Each of these modules may be in communication with each other.

The modules of the apparatus 615 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one radio frequency (RF) receiver. In some examples, the receiver module 610 or RF receiver may be used for LTE/LTE-A communications, Wi-Fi communications, or mesh network communications, as described, for example, with reference to FIG. 1. The receiver module 610 may be used to receive various types of data or control signals (i.e., transmissions) over one or more communication links of a wireless communication system, such as one or more communication links of the wireless communication system 100 described with reference to FIG. 1.

In some examples, the transmitter module 630 may include at least one RF transmitter. In some examples, the transmitter module 630 or RF transmitter may be used for LTE/LTE-A communications, Wi-Fi communications, or mesh network communications, as described, for example, with reference to FIG. 1. The transmitter module 630 may be used to transmit various types of data or control signals (i.e., transmissions) over one or more communication links of a wireless communication system, such as one or more communication links of the wireless communication system 100 described with reference to FIG. 1.

In some examples, the wireless communication management module 620 may be used to manage one or more aspects of wireless communication for the apparatus 615 or a first device including the apparatus 615. In some examples, the wireless communication management module 620 may include a subframe structure management module 635. The subframe structure management module 635 may include a subframe structure termination module 640. The subframe structure termination module 640 may include an optional delay override module 645.

In some examples, the subframe structure management module 635 may be used to wirelessly communicate with a second device (e.g., a scheduling devices such as a base station, Wi-Fi access point, or mesh network scheduler) according to a first subframe structure. The first subframe structure may include a first periodic sequence of downlink TTIs and uplink TTIs. The subframe structure management module 635 may also be used to wirelessly communicate with the second device according to subsequent subframe structures. For example, the subframe structure management module 635 may be used to wirelessly communicate with the second device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion. In some examples, both of the first periodic sequence and second periodic sequence may include an interlaced portion and a one-shot portion.

In some examples, the first periodic sequence of downlink TTIs and uplink TTIs may include a repeating sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first periodic sequence may be associated with a nominal trigger-response delay parameter (N) and/or each uplink TTI of the first periodic sequence may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

In some examples, the subframe structure termination module 640 may be used to receive a subframe truncation parameter from the second device, and to terminate the first subframe structure based at least in part on the subframe truncation parameter. The subframe truncation parameter may be received, for example, during the first subframe structure. In some examples, the subframe truncation parameter may determine a total number of TTIs in the first subframe structure, and may partition the total number of TTIs into an interlaced portion and a tail portion. In some examples, the tail portion may include a one-shot portion.

In some examples, wirelessly communicating with the second device according to the first subframe structure may include receiving a first trigger message from the second device during a first downlink TTI within the interlaced portion of the first subframe structure. Wirelessly communicating with the second device according to the first subframe structure may also include transmitting to the second device, subsequent to receiving the first trigger message, a first response message associated with the first trigger message. The first response message may be transmitted in an earliest uplink TTI of the first subframe structure that satisfies the nominal trigger-response delay parameter associated with the first downlink TTI. Wirelessly communicating with the second device according to the first subframe structure may further include receiving a second trigger message from the second device during a second downlink TTI within the tail portion of the first subframe structure. Still further, wirelessly communicating with the second device according to the first subframe structure may include transmitting to the second device, subsequent to receiving the second trigger message, a second response message associated with the second trigger message. The second response message may be transmitted in a last uplink TTI of the first subframe structure.

In some examples, wirelessly communicating with the second device according to the first subframe structure may include transmitting a first response message to the second device during a first uplink TTI within the interlaced portion of the first subframe structure. Wirelessly communicating with the second device according to the first subframe structure may also include receiving from the second device, subsequent to transmitting the first response message, a first retrigger message associated with the first response message. The first retrigger message may be received in a downlink TTI of the first subframe structure that satisfies the nominal response-retrigger delay parameter associated with the first uplink TTI. Wirelessly communicating with the second device according to the first subframe structure may further include transmitting a second response message to the second device during a second uplink TTI within the tail portion. Still further, wirelessly communicating with the second device according to the first subframe structure may include receiving from the second device, subsequent to transmitting the second response message, a second retrigger message. The second retrigger message may be received in a second subframe structure subsequent to the first subframe structure.

In some examples, the optional delay override module 645 may be used to override a nominal trigger-response delay parameter or a nominal response-retrigger delay parameter associated with a TTI of the first subframe structure based at least in part on the subframe truncation parameter. In some examples, overriding a nominal trigger-response delay parameter may include reducing a delay indicated by the nominal trigger-response delay parameter to enable transmission of a response message before termination of the first subframe structure.

Figure 7:
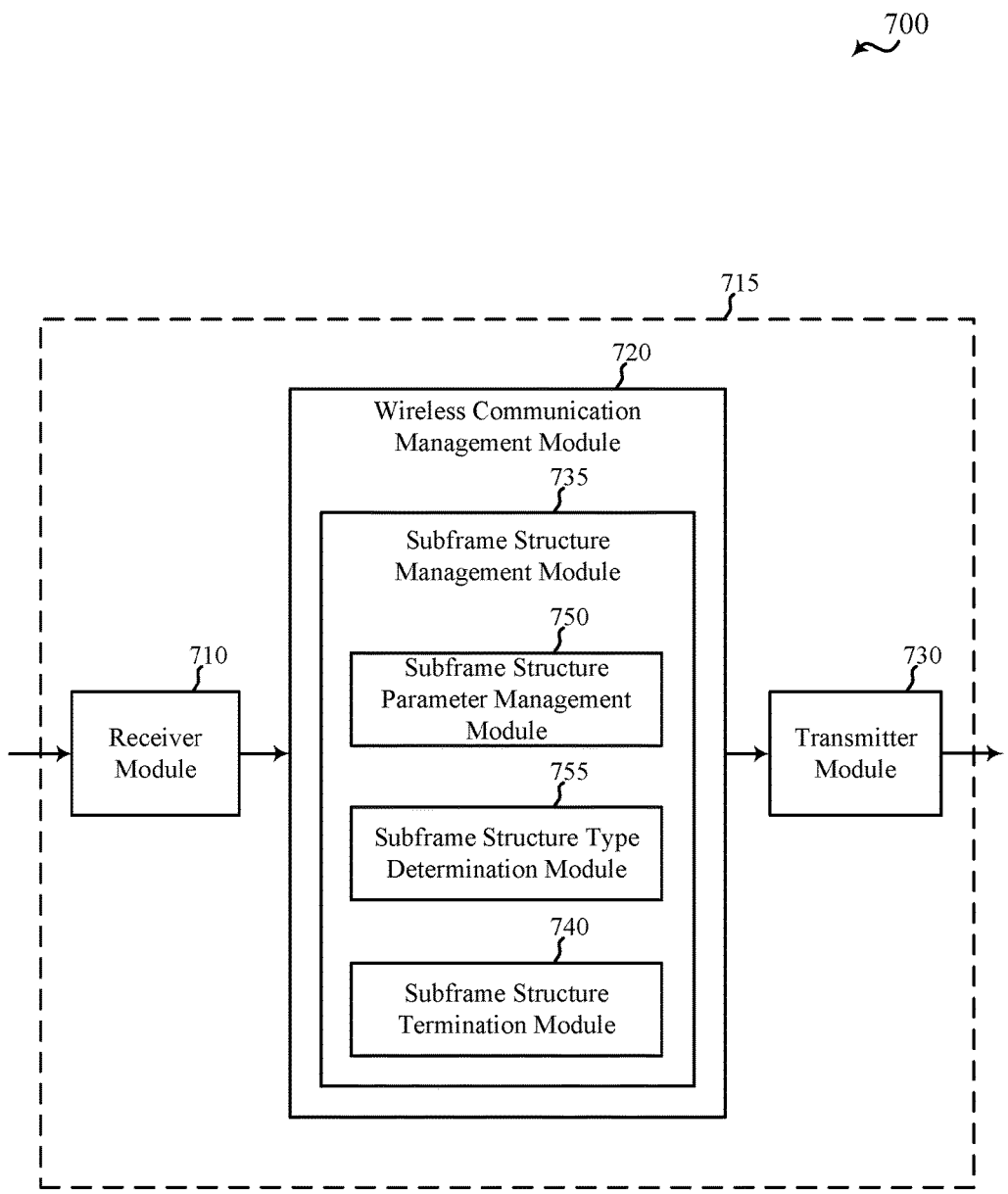
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the UEs 115 described with reference to FIG. 1, or aspects of the apparatus 615 described with reference to FIG. 6. The apparatus 715 may also be or include a processor. The apparatus 715 may include a receiver module 710, a wireless communication management module 720, or a transmitter module 730. Each of these modules may be in communication with each other.

The modules of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver. In some examples, the receiver module 710 or RF receiver may be used for LTE/LTE-A communications, Wi-Fi communications, or mesh network communications, as described, for example, with reference to FIG. 1. The receiver module 710 may be used to receive various types of data or control signals (i.e., transmissions) over one or more communication links of a wireless communication system, such as one or more communication links of the wireless communication system 100 described with reference to FIG. 1.

In some examples, the transmitter module 730 may include at least one RF transmitter. In some examples, the transmitter module 730 or RF transmitter may be used for LTE/LTE-A communications, Wi-Fi communications, or mesh network communications, as described, for example, with reference to FIG. 1. The transmitter module 730 may be used to transmit various types of data or control signals (i.e., transmissions) over one or more communication links of a wireless communication system, such as one or more communication links of the wireless communication system 100 described with reference to FIG. 1.

In some examples, the wireless communication management module 720 may be used to manage one or more aspects of wireless communication for the apparatus 715 or a first device including the apparatus 715. In some examples, the wireless communication management module 720 may include a subframe structure management module 735. The subframe structure management module 735 may include a subframe structure parameter management module 750, a subframe structure type determination module 755, or a subframe structure termination module 740.

The subframe structure parameter management module 750 may be used to receive and optionally store a number of parameters pertaining to one or more subframe structures. In some examples, a parameter in the number of parameters may be received or stored during a preconfiguration of the first device; semi-statically as the first device wirelessly communicates with a second device (e.g., a scheduling devices such as a base station, Wi-Fi access point, or mesh network scheduler), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may be received from the second device, and may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be received: semi-statically at a frequency less than once per subframe structure, or dynamically at a beginning of each subframe structure.

The subframe structure management module 735 may be used to wirelessly communicate with the second device according to a first subframe structure. The first subframe structure may include a first periodic sequence of downlink TTIs and uplink TTIs.

The subframe structure type determination module 755 may be used to receive a signal (e.g., a bit) indicating a type of the first subframe structure. In some examples, a signal may be received at a beginning of the first subframe structure indicating which of two or more subframe structures is used for the first subframe structure. In some examples, a bit may be received at a beginning of the first subframe structure indicating whether the first subframe structure follows a configuration of a default subframe structure or a predefined one-shot subframe structure.

The subframe structure termination module 740 may be used to receive a subframe truncation parameter from the second device. The subframe truncation parameter may be received, for example, during the first subframe structure. In some examples, the subframe truncation parameter may be received during a dynamically determined TTI of the first subframe structure, which dynamically determined TTI occurs before commencing terminating the first subframe structure. In some examples, the subframe truncation parameter may be received during a predetermined TTI of the first subframe structure.

In some examples, the subframe truncation parameter may determine a total number of TTIs in the first subframe structure and may partition the total number of TTIs into an interlaced portion and a tail portion. In some examples, the tail portion may include a one-shot portion.

Figure 8:
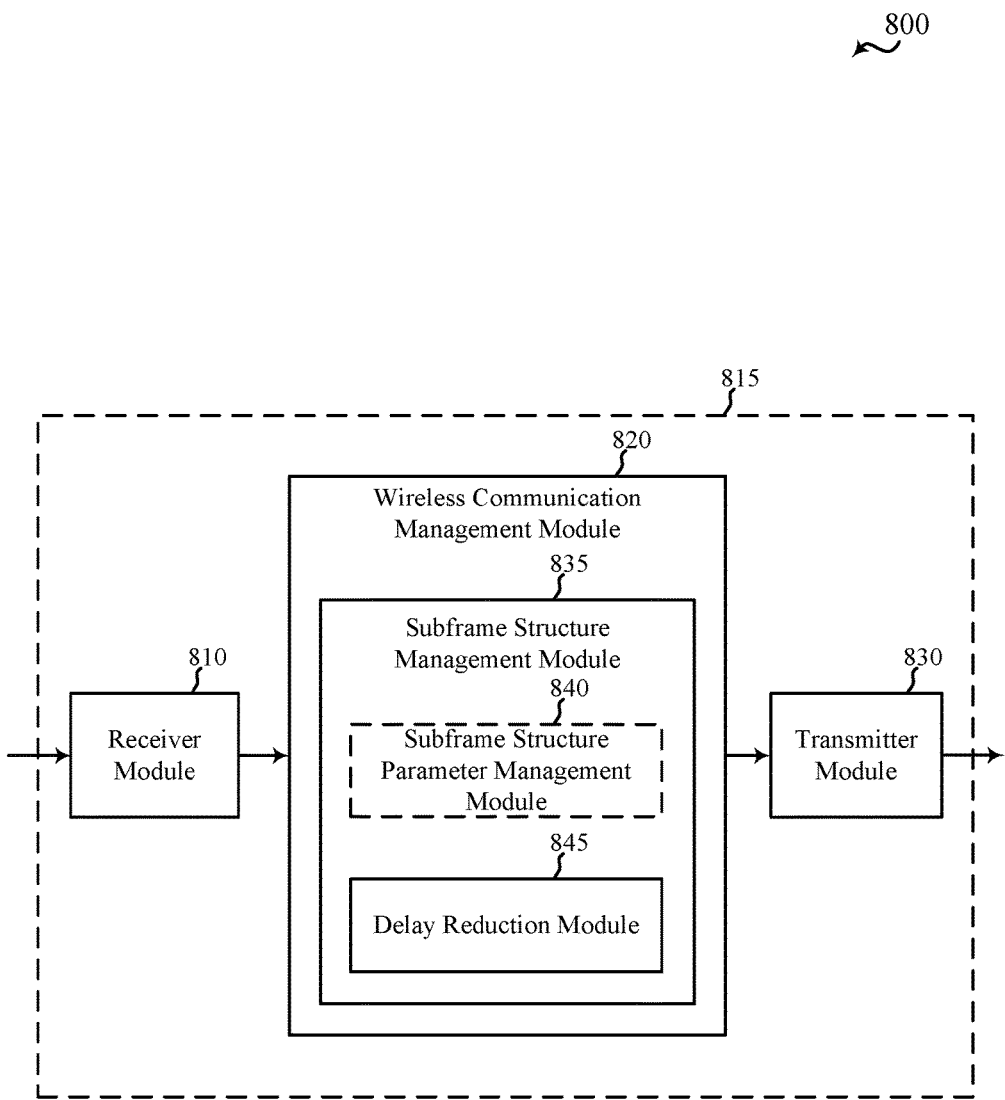
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115 described with reference to FIG. 1, or aspects of the apparatuses 615 or 715 described with reference to FIG. 6 or 7. The apparatus 815 may also be or include a processor. The apparatus 815 may include a receiver module 810, a wireless communication management module 820, or a transmitter module 830. Each of these modules may be in communication with each other.

The modules of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver. In some examples, the receiver module 810 or RF receiver may be used for LTE/LTE-A communications, Wi-Fi communications, or mesh network communications, as described, for example, with reference to FIG. 1. The receiver module 810 may be used to receive various types of data or control signals (i.e., transmissions) over one or more communication links of a wireless communication system, such as one or more communication links of the wireless communication system 100 described with reference to FIG. 1.

In some examples, the transmitter module 830 may include at least one RF transmitter. In some examples, the transmitter module 830 or RF transmitter may be used for LTE/LTE-A communications, Wi-Fi communications, or mesh network communications, as described, for example, with reference to FIG. 1. The transmitter module 830 may be used to transmit various types of data or control signals (i.e., transmissions) over one or more communication links of a wireless communication system, such as one or more communication links of the wireless communication system 100 described with reference to FIG. 1.

In some examples, the wireless communication management module 820 may be used to manage one or more aspects of wireless communication for the apparatus 815 or a first device including the apparatus 815. In some examples, the wireless communication management module 820 may include a subframe structure management module 835. The subframe structure management module 835 may include an optional subframe structure parameter management module 840, or a delay reduction module 845.

The subframe structure parameter management module 840 may be used to receive and optionally store a number of parameters pertaining to one or more subframe structures. In some examples, a parameter in the number of parameters may be received or stored during a preconfiguration of the first device; semi-statically as the first device wirelessly communicates with a second device (e.g., a scheduling devices such as a base station, Wi-Fi access point, or mesh network scheduler), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may be received from the second device, and may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be received: semi-statically at a frequency less than once per subframe structure, or dynamically at a beginning of each subframe structure.

The subframe structure management module 835 may be used to wirelessly communicate with the second device according to a parameterized self-contained subframe structure having an interlaced portion and a tail portion. In some examples, the tail portion may include a one-shot portion. The first subframe structure may include a periodic sequence of downlink TTIs and uplink TTIs.

In some examples, the subframe structure may include a sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first subframe structure may be associated with a nominal trigger-response delay parameter (N) and/or each uplink TTI of the subframe structure may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

The delay reduction module 845 may be used to reduce a delay indicated by a nominal trigger-response delay parameter associated with a downlink TTI of the subframe structure, to enable a response message corresponding to the downlink TTI to be transmitted during the tail portion and before termination of the subframe structure.

In some examples, aspects of two or more of the apparatuses 615, 715, or 815 described with reference to FIG. 6, 7, or 8 may be combined.

Figure 9:
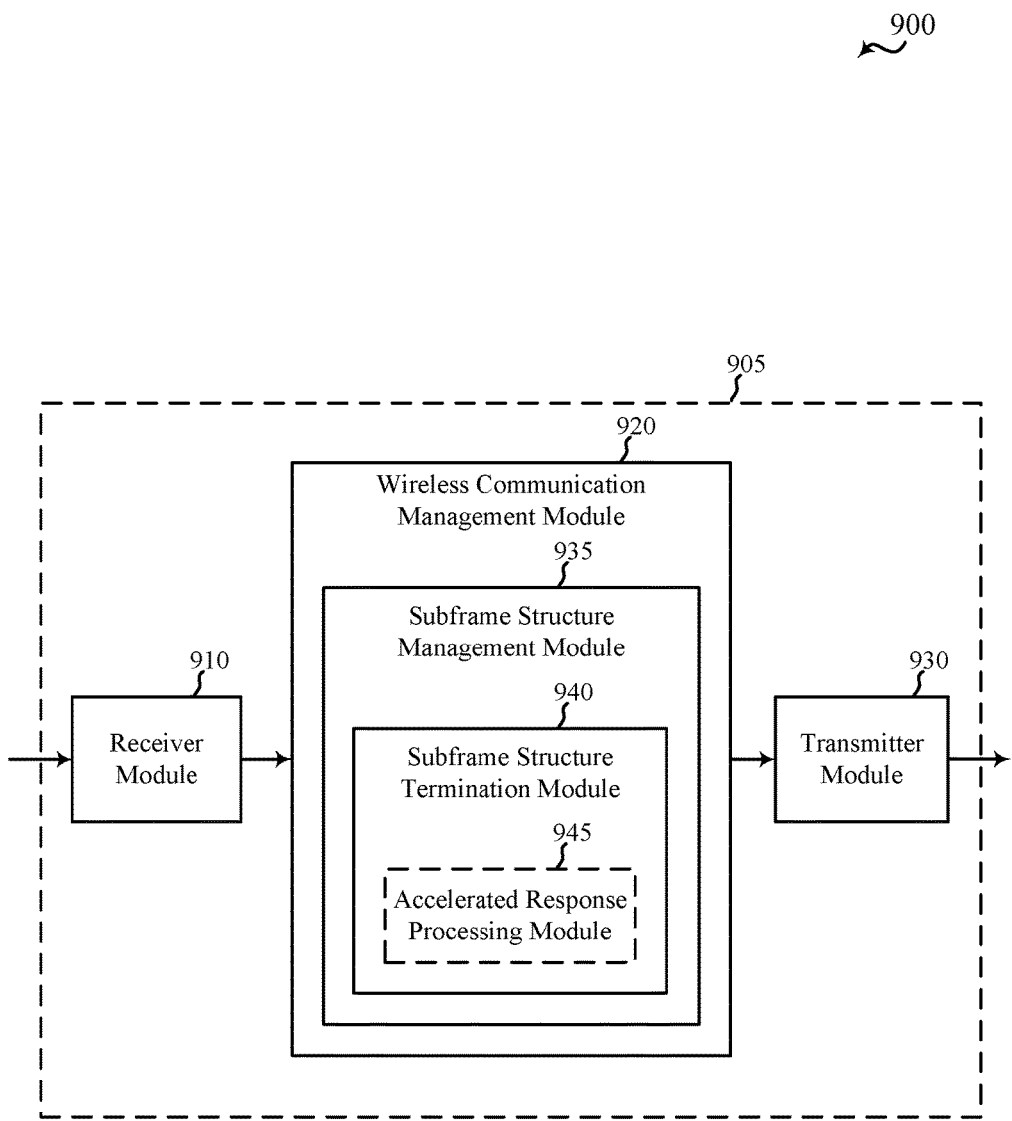
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the scheduling devices (e.g., base stations 105, Wi-Fi access points 135, or mesh network schedulers) described with reference to FIG. 1. The apparatus 905 may also be or include a processor. The apparatus 905 may include a receiver module 910, a wireless communication management module 920, or a transmitter module 930. Each of these modules may be in communication with each other.

The modules of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver. In some examples, the receiver module 910 or RF receiver may be used for LTE/LTE-A communications, Wi-Fi communications, or mesh network communications, as described, for example, with reference to FIG. 1. The receiver module 910 may be used to receive various types of data or control signals (i.e., transmissions) over one or more communication links of a wireless communication system, such as one or more communication links of the wireless communication system 100 described with reference to FIG. 1.

In some examples, the transmitter module 930 may include at least one RF transmitter. In some examples, the transmitter module 930 or RF transmitter may be used for LTE/LTE-A communications, Wi-Fi communications, or mesh network communications, as described, for example, with reference to FIG. 1. The transmitter module 930 may be used to transmit various types of data or control signals (i.e., transmissions) over one or more communication links of a wireless communication system, such as one or more communication links of the wireless communication system 100 described with reference to FIG. 1.

In some examples, the wireless communication management module 920 may be used to manage one or more aspects of wireless communication for the apparatus 905 or a second device including the apparatus 905. In some examples, the wireless communication management module 920 may include a subframe structure management module 935. The subframe structure management module 935 may include a subframe structure termination module 940. The subframe structure termination module 940 may include an optional accelerated response processing module 945.

The subframe structure management module 935 may be used to wirelessly communicating with a first device (e.g., a UE) according to a first subframe structure. The first subframe structure may include a first periodic sequence of downlink TTIs and uplink TTIs. The subframe structure management module 935 may also be used to wirelessly communicate with the first device according to subsequent subframe structures. For example, the subframe structure management module 935 may be used to wirelessly communicate with the first device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion. In some examples, both of the first periodic sequence and second periodic sequence may include an interlaced portion and a one-shot portion.

In some examples, the first periodic sequence of downlink TTIs and uplink TTIs may include a repeating sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first periodic sequence may be associated with a nominal trigger-response delay parameter (N) and/or each uplink TTI of the first periodic sequence may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

The subframe structure termination module 940 may be used to transmit a subframe truncation parameter to the first device. The subframe truncation parameter may be transmitted, for example, during the first subframe structure. In some examples, the subframe truncation parameter may determine a total number of TTIs in the first subframe structure, and may partition the total number of TTIs into an interlaced portion and a tail portion. In some examples, the tail portion may include a one-shot portion. The subframe structure termination module 940 may also be used to terminating the first subframe structure based at least in part on the subframe truncation parameter.

In some examples, wirelessly communicating with the first device according to the first subframe structure may include transmitting a first trigger message to the first device during a first downlink TTI within the interlaced portion of the first subframe structure. Wirelessly communicating with the first device according to the first subframe structure may also include receiving from the first device, subsequent to transmitting the first trigger message, a first response message associated with the first trigger message. The first response message may be received in an earliest uplink TTI of the first subframe structure that satisfies the nominal trigger-response delay parameter associated with the first downlink TTI. Wirelessly communicating with the first device according to the first subframe structure may further include transmitting a second trigger message to the first device during a second downlink TTI within the tail portion of the first subframe structure. Still further, wirelessly communicating with the second device according to the first subframe structure may include receiving from the first device, subsequent to transmitting the second trigger message, a second response message associated with the second trigger message. The second response message may be received in a last uplink TTI of the first subframe structure.

In some examples, wirelessly communicating with the first device according to the first subframe structure may include receiving a first response message from the first device during a first uplink TTI within the interlaced portion of the first subframe structure. Wirelessly communicating with the first device according to the first subframe structure may also include transmitting to the first device, subsequent to receiving the first response message, a first retrigger message associated with the first response message. The first retrigger message may be transmitted in a downlink TTI of the first subframe structure that satisfies the nominal response-retrigger delay parameter associated with the first uplink TTI. Wirelessly communicating with the first device according to the first subframe structure may further include receiving a second response message from the first device during a second uplink TTI within the tail portion. Still further, wirelessly communicating with the first device according to the first subframe structure may include transmitting to the first device, subsequent to receiving the second response message, a second retrigger message. The second retrigger message may be transmitted in a second subframe structure subsequent to the first subframe structure.

The optional accelerated response processing module 945 may be used to receive, before terminating the first subframe structure, a transmission of a response message associated with a trigger message transmitted during a TTI of the first subframe structure, where the response message is received with a first trigger-response delay that is reduced compared to a second trigger-response delay indicated by a nominal trigger-response delay parameter associated with the TTI.

Figure 10:
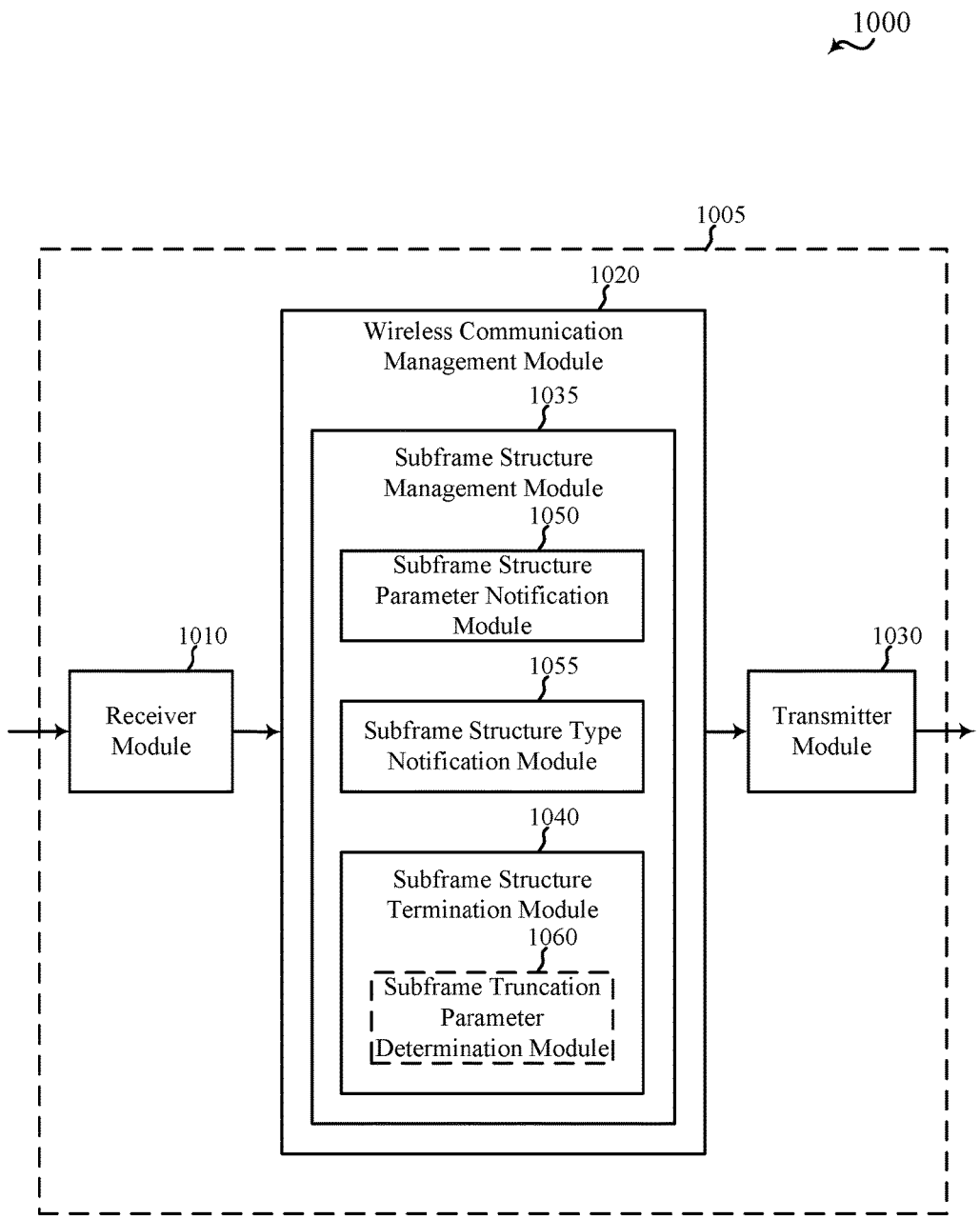
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1005 may be an example of aspects of one or more of the scheduling devices (e.g., base stations 105, Wi-Fi access points 135, or mesh network schedulers) described with reference to FIG. 1, or aspects of the apparatus 905 described with reference to FIG. 9. The apparatus 1005 may also be or include a processor. The apparatus 1005 may include a receiver module 1010, a wireless communication management module 1020, or a transmitter module 1030. Each of these modules may be in communication with each other.

The modules of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one RF receiver. In some examples, the receiver module 1010 or RF receiver may be used for LTE/LTE-A communications, Wi-Fi communications, or mesh network communications, as described, for example, with reference to FIG. 1. The receiver module 1010 may be used to receive various types of data or control signals (i.e., transmissions) over one or more communication links of a wireless communication system, such as one or more communication links of the wireless communication system 100 described with reference to FIG. 1.

In some examples, the transmitter module 1030 may include at least one RF transmitter. In some examples, the transmitter module 1030 or RF transmitter may be used for LTE/LTE-A communications, Wi-Fi communications, or mesh network communications, as described, for example, with reference to FIG. 1. The transmitter module 1030 may be used to transmit various types of data or control signals (i.e., transmissions) over one or more communication links of a wireless communication system, such as one or more communication links of the wireless communication system 100 described with reference to FIG. 1.

In some examples, the wireless communication management module 1020 may be used to manage one or more aspects of wireless communication for the apparatus 1005 or a second device including the apparatus 1005. In some examples, the wireless communication management module 1020 may include a subframe structure management module 1035. The subframe structure management module 1035 may include a subframe structure parameter notification module 1050, a subframe structure type notification module 1055, or a subframe structure termination module 1040. The subframe structure termination module 1040 may include a subframe truncation parameter determination module 1060.

The subframe structure parameter notification module 1050 may be used to transmit a number of parameters pertaining to one or more subframe structures. In some examples, a parameter in the number of parameters may be transmitted semi-statically as the second device wirelessly communicates with a first device (e.g., a UE), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be transmitted: semi-statically at a frequency less than once per subframe structure, or dynamically at a beginning of each subframe structure.

The subframe structure management module 1035 may be used to wirelessly communicate with the first device according to a first subframe structure. The first subframe structure may include a first periodic sequence of downlink TTIs and uplink TTIs.

The subframe structure type notification module 1055 may be used to transmit a signal (e.g., a bit) indicating a type of the first subframe structure. In some examples, a signal may be transmitted at a beginning of the first subframe structure indicating which of two or more subframe structures is used for the first subframe structure. In some examples, a bit may be transmitted at a beginning of the first subframe structure indicating whether the first subframe structure follows a configuration of a default subframe structure or a predefined one-shot subframe structure.

The subframe truncation parameter determination module 1060 may be used to dynamically determine a value of a subframe truncation parameter. In some examples, the value of the subframe truncation parameter may be based on at least one of: a traffic type, or a first bandwidth of the first device, or a second bandwidth associated with traffic for the first device, or a memory constraint, or a packet size, or an indicated service level, or a combination thereof.

The subframe structure termination module 1040 may be used to transmit the subframe truncation parameter to the first device. The subframe truncation parameter may be transmitted, for example, during the first subframe structure. In some examples, the subframe truncation parameter may be transmitted during a dynamically determined TTI of the first subframe structure, which dynamically determined TTI occurs before commencing terminating the first subframe structure. In some examples, the subframe truncation parameter may be transmitted during a predetermined TTI of the first subframe structure. In some examples, the subframe truncation parameter may determine a total number of TTIs in the first subframe structure and may partition the total number of TTIs into an interlaced portion and a tail portion. In some examples, the tail portion may include a one-shot portion. The subframe structure termination module 1040 may also be used to terminate the first subframe structure based at least in part on the subframe truncation parameter.

Figure 11:
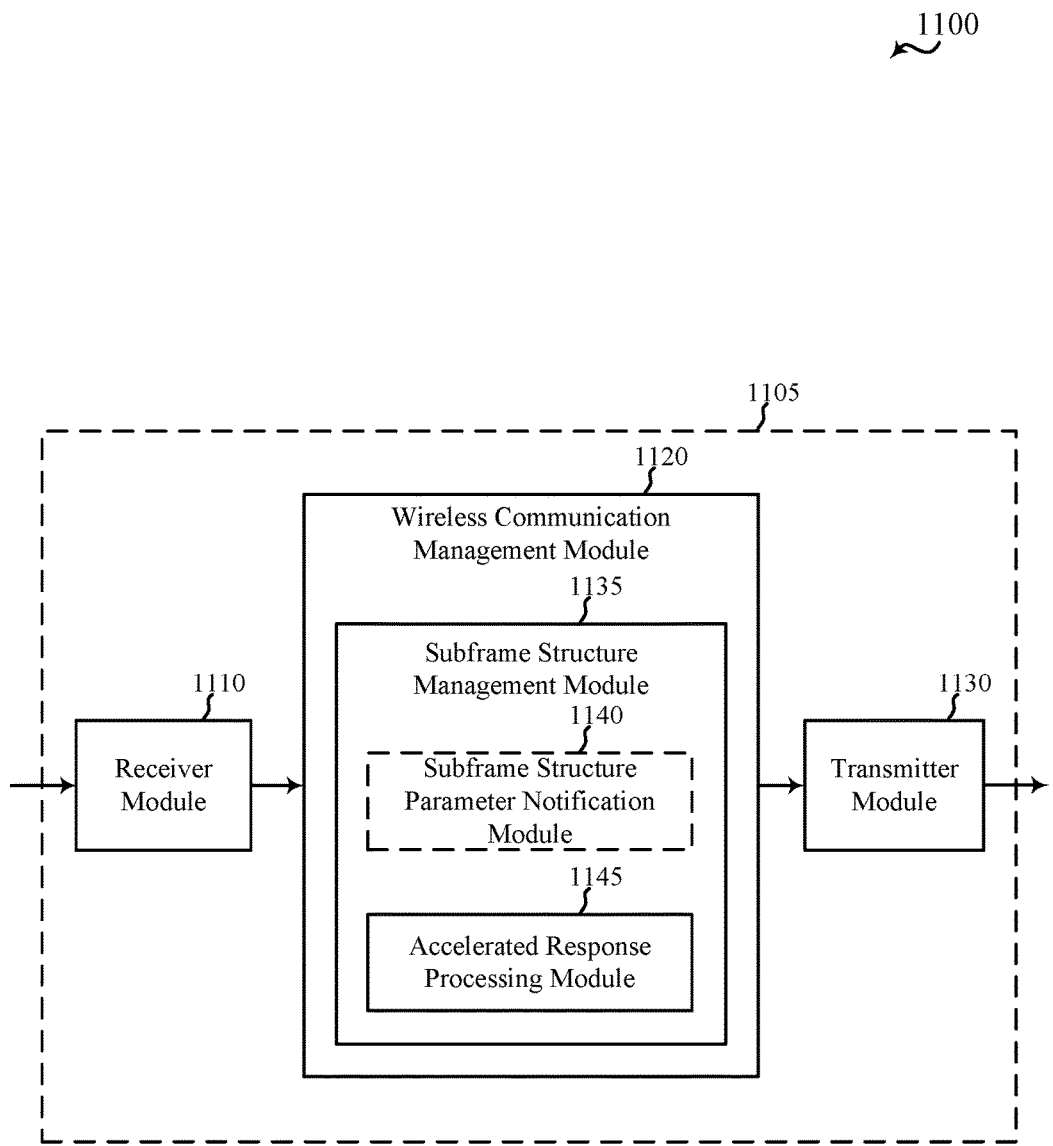
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the scheduling devices (e.g., base stations 105, Wi-Fi access points 135, or mesh network schedulers) described with reference to FIG. 1, or aspects of the apparatuses 905 or 1005 described with reference to FIG. 9 or 10. The apparatus 1105 may also be or include a processor. The apparatus 1105 may include a receiver module 1110, a wireless communication management module 1120, or a transmitter module 1130. Each of these modules may be in communication with each other.

The modules of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, or other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver. In some examples, the receiver module 1110 or RF receiver may be used for LTE/LTE-A communications, Wi-Fi communications, or mesh network communications, as described, for example, with reference to FIG. 1. The receiver module 1110 may be used to receive various types of data or control signals (i.e., transmissions) over one or more communication links of a wireless communication system, such as one or more communication links of the wireless communication system 100 described with reference to FIG. 1.

In some examples, the transmitter module 1130 may include at least one RF transmitter. In some examples, the transmitter module 1130 or RF transmitter may be used for LTE/LTE-A communications, Wi-Fi communications, or mesh network communications, as described, for example, with reference to FIG. 1. The transmitter module 1130 may be used to transmit various types of data or control signals (i.e., transmissions) over one or more communication links of a wireless communication system, such as one or more communication links of the wireless communication system 100 described with reference to FIG. 1.

In some examples, the wireless communication management module 1120 may be used to manage one or more aspects of wireless communication for the apparatus 1105 or a second device including the apparatus 1105. In some examples, the wireless communication management module 1120 may include a subframe structure management module 1135. The subframe structure management module 1135 may include an optional subframe structure parameter notification module 1140 or an accelerated response processing module 1145.

The subframe structure parameter notification module 1140 may be used to transmit a number of parameters pertaining to one or more subframe structures. In some examples, a parameter in the number of parameters may be transmitted semi-statically as the second device wirelessly communicates with a first device (e.g., a UE), at a frequency less than once per subframe; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be transmitted: semi-statically at a frequency less than once per subframe structure, or dynamically at a beginning of each subframe structure.

The subframe structure management module 1135 may be used to wirelessly communicate with the first device according to a parameterized self-contained subframe structure having an interlaced portion and a tail portion. In some examples, the tail portion may include a one-shot portion. The first subframe structure may include a periodic sequence of downlink TTIs and uplink TTIs.

In some examples, the subframe structure may include a sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the subframe structure may be associated with a nominal trigger-response delay parameter (N) and/or each uplink TTI of the subframe structure may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

The accelerated response processing module 1145 may be used to receive, during the tail portion and before termination of the subframe structure, a transmission of a response message corresponding to a downlink TTI of the subframe structure, where the response message is received with a first trigger-response delay that is reduced compared to a second trigger-response delay indicated by a nominal trigger-response delay parameter associated with the downlink TTI.

In some examples, aspects of two or more of the apparatuses 905, 1005, or 1105 described with reference to FIG. 9, 10, or 11 may be combined.

Figure 12:
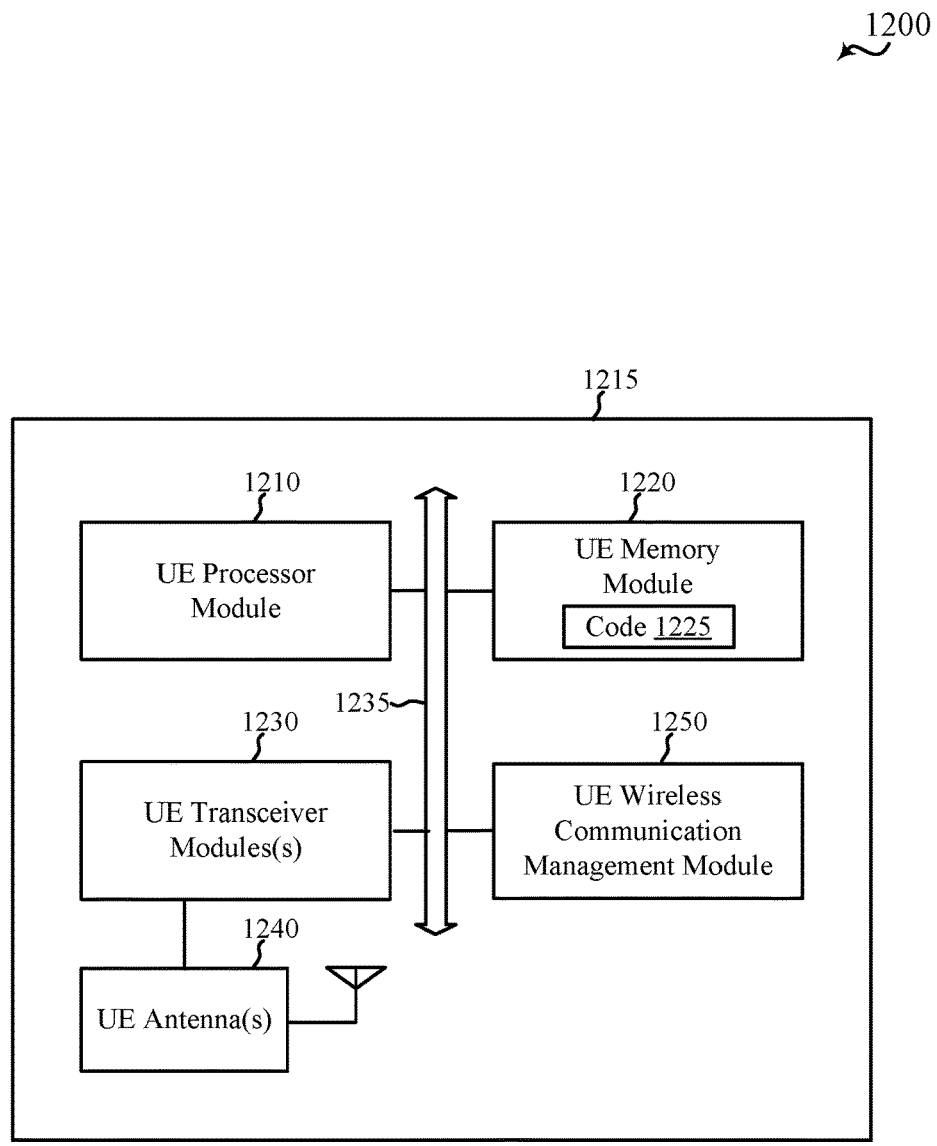
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UEs 115 described with reference to FIG. 1, or aspects of one or more of the apparatuses 615, 715, or 815 described with reference to FIG. 6, 7, or 8. The UE 1215 may be configured to implement at least some of the UE or apparatus features and functions described with reference to FIG. 1, 2, 3, 4, 5, 6, 7, or 8.

The UE 1215 may include a UE processor module 1210, a UE memory module 1220, at least one UE transceiver module (represented by UE transceiver module(s) 1230), at least one UE antenna (represented by UE antenna(s) 1240), or a UE wireless communication management module 1250. Each of these components may be in communication with each other, directly or indirectly, over one or more buses 1235.

The UE memory module 1220 may include random access memory (RAM) or read-only memory (ROM). The UE memory module 1220 may store computer-readable, computer-executable code 1225 containing instructions that are configured to, when executed, cause the UE processor module 1210 to perform various functions described herein related to wireless communication, including communicating with another device using a subframe structure terminated based at least in part on a subframe truncation parameter and/or communicating with another device using a parameterized self-contained subframe structure having an interlaced portion and a tail portion. Alternatively, the code 1225 may not be directly executable by the UE processor module 1210 but be configured to cause the UE 1215 (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 or information to be sent to the UE transceiver module(s) 1230 for transmission through the UE antenna(s) 1240. The UE processor module 1210 may handle, alone or in connection with the UE wireless communication management module 1250, various aspects of communicating over (or managing communications over) a radio frequency spectrum.

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may be configured to communicate bi-directionally, via the UE antenna(s) 1240, with one or more of the base stations 105, 205, or 205-*a* described with reference to FIG. 1 or 2, or one or more of the apparatuses 905, 1005, or 1105 described with reference to FIG. 9, 10, or 11. While the UE 1215 may include a single UE antenna, there may be examples in which the UE 1215 may include multiple UE antennas 1240.

The UE wireless communication management module 1250 may be configured to perform or control some or all of the UE or apparatus features or functions described with reference to FIG. 1, 2, 3, 4, 5, 6, 7, or 8 related to wireless communication over a radio frequency spectrum. The UE wireless communication management module 1250, or portions of it, may include a processor, or some or all of the functions of the UE wireless communication management module 1250 may be performed by the UE processor module 1210 or in connection with the UE processor module 1210. In some examples, the UE wireless communication management module 1250 may be an example of the wireless communication management module 620, 720, or 820 described with reference to FIG. 6, 7, or 8.

Figure 13:
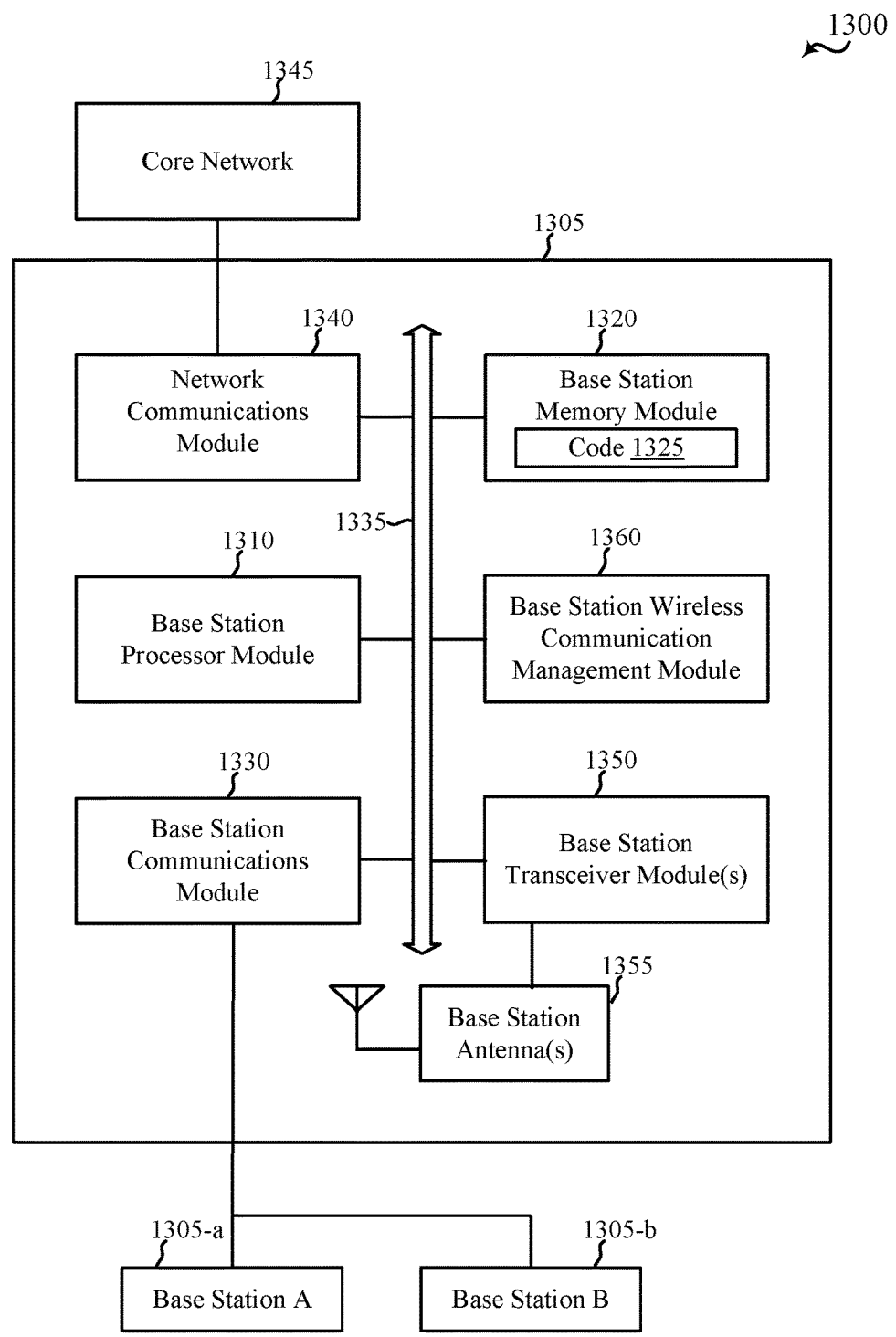
FIG. 13 shows a block diagram of a base station (e.g., a base station forming part or all of an eNB) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of one or more aspects of the base station 105 described with reference to FIG. 1, aspects of one or more of the apparatuses 905, 1005, or 1105 described with reference to FIG. 9, 10, or 11. The base station 1305 may be configured to implement or facilitate at least some of the base station features and functions described with reference to FIG. 1, 2, 3, 4, 5, 9, 10, or 11.

The base station 1305 may include a base station processor module 1310, a base station memory module 1320, at least one base station transceiver module (represented by base station transceiver module(s) 1350), at least one base station antenna (represented by base station antenna(s) 1355), or a base station wireless communication management module 1360. The base station 1305 may also include one or more of a base station communications module 1330 or a network communications module 1340. Each of these components may be in communication with each other, directly or indirectly, over one or more buses 1335.

The base station memory module 1320 may include RAM or ROM. The base station memory module 1320 may store computer-readable, computer-executable code 1325 containing instructions that are configured to, when executed, cause the base station processor module 1310 to perform various functions described herein related to wireless communication, including communicating with another device using a subframe structure terminated based at least in part on a subframe truncation parameter and/or communicating with another device using a parameterized self-contained subframe structure having an interlaced portion and a tail portion. Alternatively, the code 1325 may not be directly executable by the base station processor module 1310 but be configured to cause the base station 1305 (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, or the network communications module 1340. The base station processor module 1310 may also process information to be sent to the transceiver module(s) 1350 for transmission through the antenna(s) 1355, to the base station communications module 1330, for transmission to one or more other base stations 1305-*a* and 1305-*b*, or to the network communications module 1340 for transmission to a core network 1345, which may be an example of one or more aspects of the core network 130 described with reference to FIG. 1. The base station processor module 1310 may handle, alone or in connection with the base station wireless communication management module 1360, various aspects of communicating over (or managing communications over) a radio frequency spectrum.

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may be configured to communicate bi-directionally, via the antenna(s) 1355, with one or more UEs or apparatuses, such as one or more of the UEs 115 or 1215 described with reference to FIG. 1 or 12, or one or more of the apparatuses 615, 715, or 815 described with reference to FIG. 6, 7, or 8. The base station 1305 may, for example, include multiple base station antennas 1355 (e.g., an antenna array). The base station 1305 may communicate with the core network 1345 through the network communications module 1340. The base station 1305 may also communicate with other base stations, such as the base stations 1305-*a* and 1305-*b*, using the base station communications module 1330.

The base station wireless communication management module 1360 may be configured to perform or control some or all of the features or functions described with reference to FIG. 1, 2, 3, 4, 5, 9, 10, or 11 related to wireless communication over a radio frequency spectrum. The base station wireless communication management module 1360, or portions of it, may include a processor, or some or all of the functions of the base station wireless communication management module 1360 may be performed by the base station processor module 1310 or in connection with the base station processor module 1310. In some examples, the base station wireless communication management module 1360 may be an example of the wireless communication management module 920, 1020, or 1120 described with reference to FIG. 9, 10, or 11.

Figure 14:
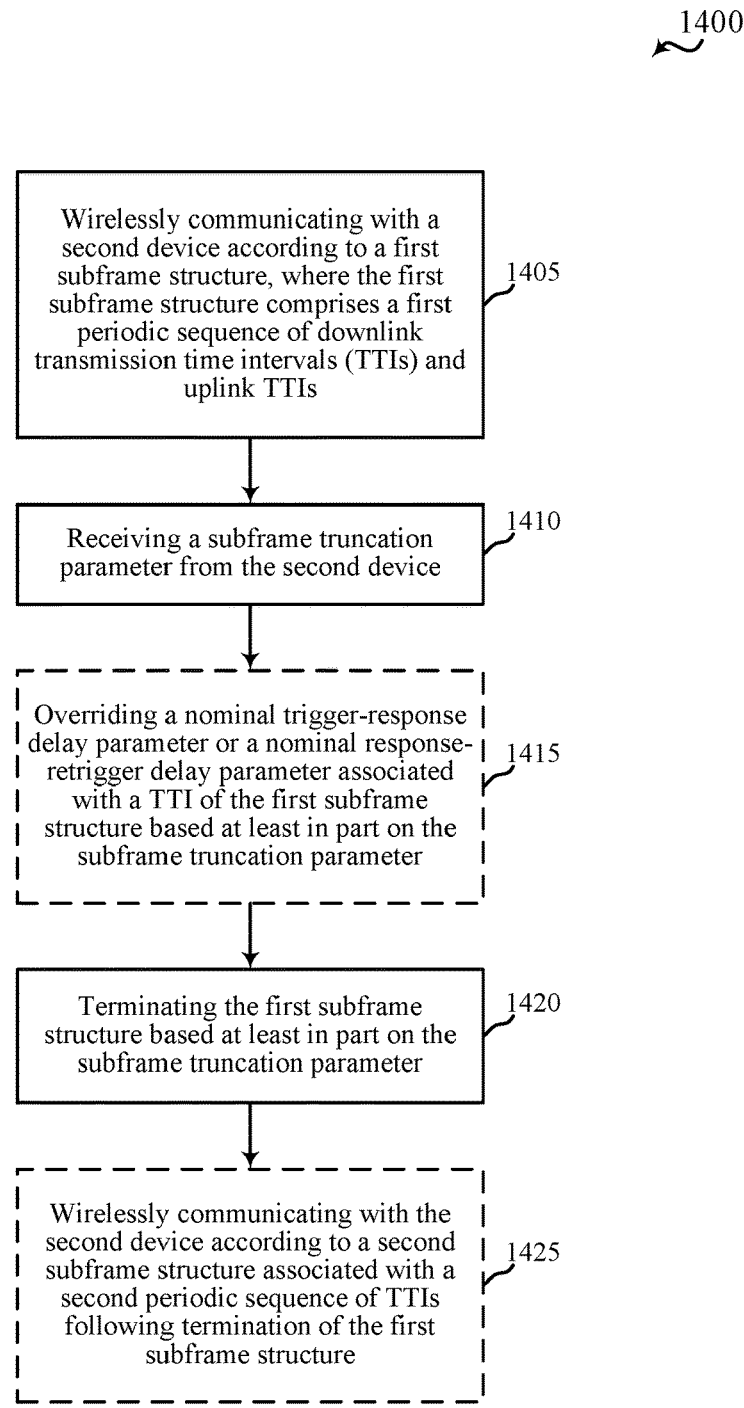
FIG. 14 is a flow chart illustrating an exemplary method of wireless communication at a first device, in accordance with various aspects of the present disclosure.

FIG. 14 is a flow chart illustrating an exemplary method 1400 of wireless communication at a first device, in accordance with various aspects of the present disclosure. For clarity, the method 1400 is described below with reference to a first device having aspects of one or more of the UEs 115 or 1215 described with reference to FIG. 1 or 12, or aspects of one or more of the apparatuses 615, 715, or 815 described with reference to FIG. 6, 7, or 8. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may include wirelessly communicating with a second device (e.g., a scheduling devices such as a base station, Wi-Fi access point, or mesh network scheduler) according to a first subframe structure. The first subframe structure may include a first periodic sequence of downlink TTIs and uplink TTIs. The operation(s) at block 1405 may be performed using the wireless communication management module 620, 720, 820, or 1250 described with reference to FIG. 6, 7, 8, or 12, or the subframe structure management module 635 or 735 described with reference to FIG. 6 or 7.

In some examples, the first periodic sequence of downlink TTIs and uplink TTIs may include a repeating sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first periodic sequence may be associated with a nominal trigger-response delay parameter (N) and/or each uplink TTI of the first periodic sequence may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

At block 1410, the method 1400 may include receiving a subframe truncation parameter from the second device. The subframe truncation parameter may be received, for example, during the first subframe structure. The operation(s) at block 1410 may be performed using the wireless communication management module 620, 720, 820, or 1250 described with reference to FIG. 6, 7, 8, or 12, or the subframe structure termination module 640 or 740 described with reference to FIG. 6 or 7.

In some examples, the subframe truncation parameter may determine a total number of TTIs in the first subframe structure, and may partition the total number of TTIs into an interlaced portion and a tail portion. In some examples, the tail portion may include a one-shot portion.

In some examples, wirelessly communicating with the second device according to the first subframe structure may include receiving a first trigger message from the second device during a first downlink TTI within the interlaced portion of the first subframe structure. Wirelessly communicating with the second device according to the first subframe structure may also include transmitting to the second device, subsequent to receiving the first trigger message, a first response message associated with the first trigger message. The first response message may be transmitted in an earliest uplink TTI of the first subframe structure that satisfies the nominal trigger-response delay parameter associated with the first downlink TTI. Wirelessly communicating with the second device according to the first subframe structure may further include receiving a second trigger message from the second device during a second downlink TTI within the tail portion of the first subframe structure. Still further, wirelessly communicating with the second device according to the first subframe structure may include transmitting to the second device, subsequent to receiving the second trigger message, a second response message associated with the second trigger message. The second response message may be transmitted in a last uplink TTI of the first subframe structure.

In some examples, wirelessly communicating with the second device according to the first subframe structure may include transmitting a first response message to the second device during a first uplink TTI within the interlaced portion of the first subframe structure. Wirelessly communicating with the second device according to the first subframe structure may also include receiving from the second device, subsequent to transmitting the first response message, a first retrigger message associated with the first response message. The first retrigger message may be received in a downlink TTI of the first subframe structure that satisfies the nominal response-retrigger delay parameter associated with the first uplink TTI. Wirelessly communicating with the second device according to the first subframe structure may further include transmitting a second response message to the second device during a second uplink TTI within the tail portion. Still further, wirelessly communicating with the second device according to the first subframe structure may include receiving from the second device, subsequent to transmitting the second response message, a second retrigger message. The second retrigger message may be received in a second subframe structure subsequent to the first subframe structure.

At block 1415, the method 1400 may optionally include overriding a nominal trigger-response delay parameter or a nominal response-retrigger delay parameter associated with a TTI of the first subframe structure based at least in part on the subframe truncation parameter. In some examples, overriding a nominal trigger-response delay parameter may include reducing a delay indicated by the nominal trigger-response delay parameter to enable transmission of a response message before termination of the first subframe structure. The operation(s) at block 1415 may be performed using the wireless communication management module 620, 720, 820, or 1250 described with reference to FIG. 6, 7, 8, or 12, or the delay override module 645 or 745 described with reference to FIG. 6 or 7.

At block 1420, the method 1400 may include terminating the first subframe structure based at least in part on the subframe truncation parameter. The operation(s) at block 1420 may be performed using the wireless communication management module 620, 720, 820, or 1250 described with reference to FIG. 6, 7, 8, or 12, or the subframe structure termination module 640 or 740 described with reference to FIG. 6 or 7.

At block 1425, the method 1400 may optionally include wirelessly communicating with the second device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion. In some examples, both of the first periodic sequence and second periodic sequence may include an interlaced portion and a one-shot portion. The operation(s) at block 1425 may be performed using the wireless communication management module 620, 720, 820, or 1250 described with reference to FIG. 6, 7, 8, or 12, or the subframe structure management module 635 or 735 described with reference to FIG. 6 or 7.

Thus, the method 1400 may provide for wireless communication. It should be noted that the method 1400 is just one implementation and that the operations of the method 1400 may be rearranged or otherwise modified such that other implementations are possible.

Figure 15:
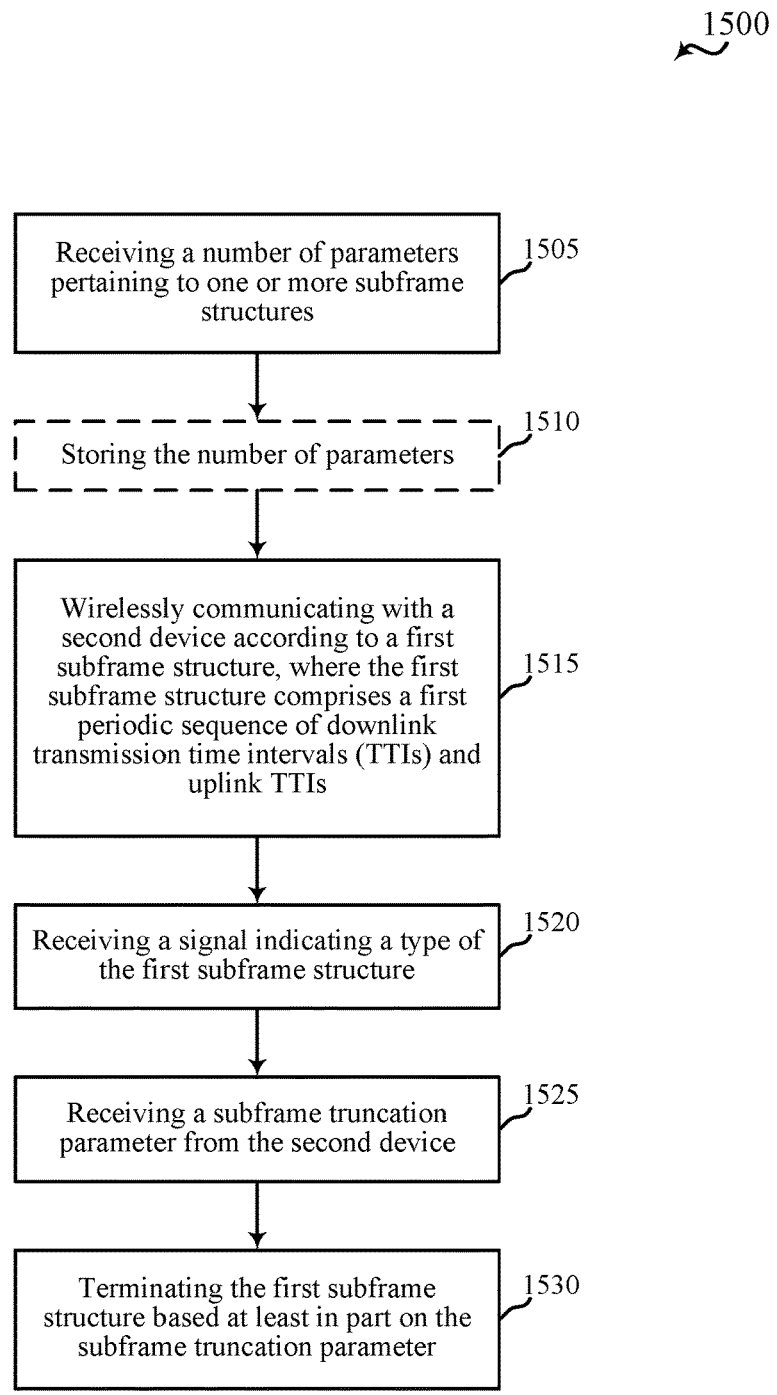
FIG. 15 is a flow chart illustrating an exemplary method of wireless communication at a first device, in accordance with various aspects of the present disclosure.

FIG. 15 is a flow chart illustrating an exemplary method 1500 of wireless communication at a first device, in accordance with various aspects of the present disclosure. For clarity, the method 1500 is described below with reference to a first device having aspects of one or more of the UEs 115 or 1215 described with reference to FIG. 1 or 12, or aspects of one or more of the apparatuses 615, 715, or 815 described with reference to FIG. 6, 7, or 8. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include receiving a number of parameters pertaining to one or more subframe structures, and at block 1510, the method 1500 may optionally include storing the number of parameters. In some examples, a parameter in the number of parameters may be received or stored during a preconfiguration of the first device; semi-statically as the first device wirelessly communicates with a second device (e.g., a scheduling devices such as a base station, Wi-Fi access point, or mesh network scheduler), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may be received from the second device, and may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be received: semi-statically at a frequency less than once per subframe structure, or dynamically at a beginning of each subframe structure.

The operation(s) at block 1505 or 1510 may be performed using the wireless communication management module 620, 720, 820, or 1250 described with reference to FIG. 6, 7, 8, or 12, or the subframe structure parameter management module 750 described with reference to FIG. 7.

At block 1515, the method 1500 may include wirelessly communicating with the second device according to a first subframe structure. The first subframe structure may include a first periodic sequence of downlink TTIs and uplink TTIs. The operation(s) at block 1515 may be performed using the wireless communication management module 620, 720, 820, or 1250 described with reference to FIG. 6, 7, 8, or 12, or the subframe structure management module 635 or 735 described with reference to FIG. 6 or 7.

At block 1520, the method 1500 may include receiving a signal (e.g., a bit) indicating a type of the first subframe structure. In some examples, a signal may be received at a beginning of the first subframe structure indicating which of two or more subframe structures is used for the first subframe structure. In some examples, a bit may be received at a beginning of the first subframe structure indicating whether the first subframe structure follows a configuration of a default subframe structure or a predefined one-shot subframe structure. The operation(s) at block 1520 may be performed using the wireless communication management module 620, 720, 820, or 1250 described with reference to FIG. 6, 7, 8, or 12, or the subframe structure type determination module 755 described with reference to FIG. 7.

At block 1525, the method 1500 may include receiving a subframe truncation parameter from the second device. The subframe truncation parameter may be received, for example, during the first subframe structure. In some examples, the subframe truncation parameter may be received during a dynamically determined TTI of the first subframe structure, which dynamically determined TTI occurs before commencing terminating the first subframe structure. In some examples, the subframe truncation parameter may be received during a predetermined TTI of the first subframe structure. The operation(s) at block 1525 may be performed using the wireless communication management module 620, 720, 820, or 1250 described with reference to FIG. 6, 7, 8, or 12, or the subframe structure termination module 640 or 740 described with reference to FIG. 6 or 7.

In some examples, the subframe truncation parameter may determine a total number of TTIs in the first subframe structure and may partition the total number of TTIs into an interlaced portion and a tail portion. In some examples, the tail portion may include a one-shot portion.

At block 1530, the method 1500 may include terminating the first subframe structure based at least in part on the subframe truncation parameter. The operation(s) at block 1530 may be performed using the wireless communication management module 620, 720, 820, or 1250 described with reference to FIG. 6, 7, 8, or 12, or the subframe structure termination module 640 or 740 described with reference to FIG. 6 or 7.

Thus, the method 1500 may provide for wireless communication. It should be noted that the method 1500 is just one implementation and that the operations of the method 1500 may be rearranged or otherwise modified such that other implementations are possible.

Figure 16:
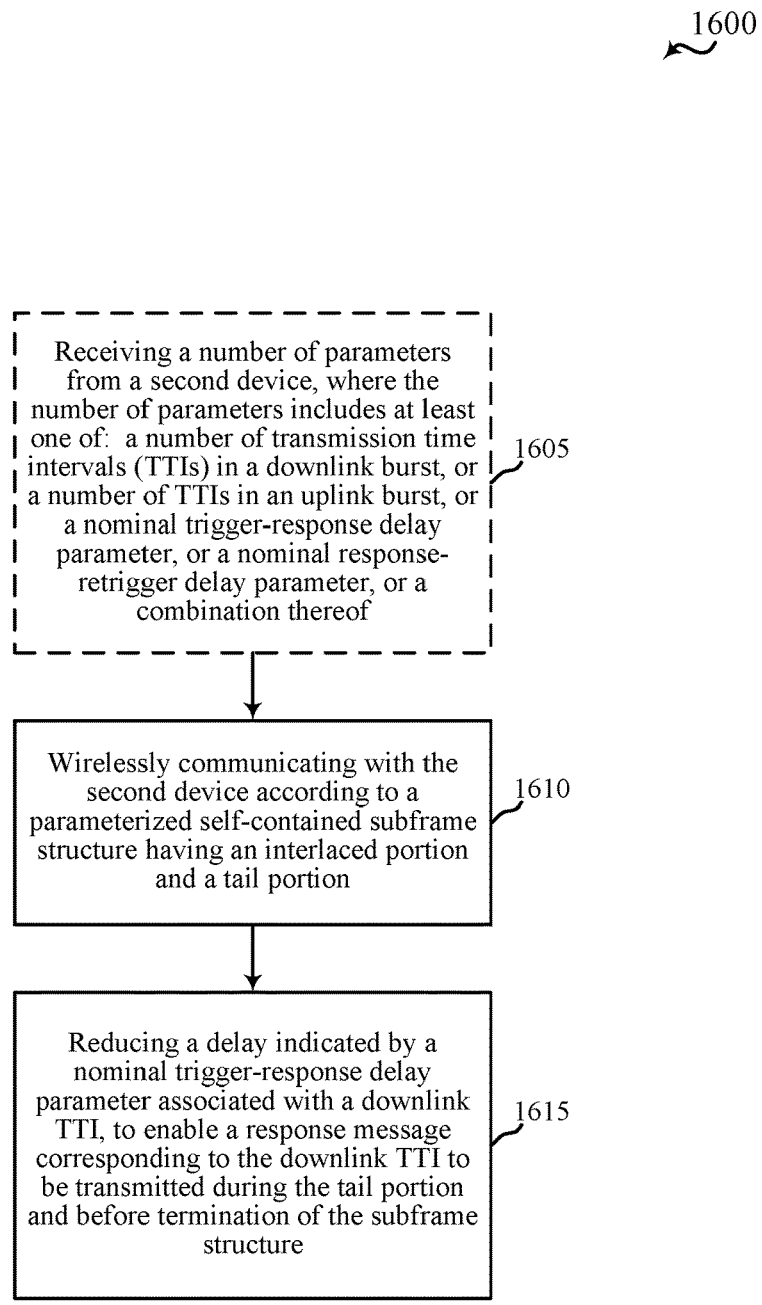
FIG. 16 is a flow chart illustrating an exemplary method of wireless communication at a first device, in accordance with various aspects of the present disclosure.

FIG. 16 is a flow chart illustrating an exemplary method 1600 of wireless communication at a first device, in accordance with various aspects of the present disclosure. For clarity, the method 1600 is described below with reference to a first device having aspects of one or more of the UEs 115 or 1215 described with reference to FIG. 1 or 12, or aspects of one or more of the apparatuses 615, 715, or 815 described with reference to FIG. 6, 7, or 8. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may optionally include receiving a number of parameters pertaining to one or more subframe structures, and at block 1610, the method 1600 may optionally include storing the number of parameters. In some examples, a parameter in the number of parameters may be received or stored during a preconfiguration of the first device; semi-statically as the first device wirelessly communicates with a second device (e.g., a scheduling devices such as a base station, Wi-Fi access point, or mesh network scheduler), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may be received from the second device, and may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be received: semi-statically at a frequency less than once per subframe structure, or dynamically at a beginning of each subframe structure.

The operation(s) at block 1605 or 1610 may be performed using the wireless communication management module 620, 720, 820, or 1250 described with reference to FIG. 6, 7, 8, or 12, or the subframe structure parameter management module 840 described with reference to FIG. 7.

At block 1615, the method 1600 may include wirelessly communicating with the second device according to a parameterized self-contained subframe structure having an interlaced portion and a tail portion. In some examples, the tail portion may include a one-shot portion. The first subframe structure may include a periodic sequence of downlink TTIs and uplink TTIs. The operation(s) at block 1615 may be performed using the wireless communication management module 620, 720, 820, or 1250 described with reference to FIG. 6, 7, 8, or 12, or the subframe structure management module 835 described with reference to FIG. 8.

In some examples, the subframe structure may include a sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first subframe structure may be associated with a nominal trigger-response delay parameter (N) and/or each uplink TTI of the subframe structure may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

At block 1620, the method 1600 may include reducing a delay indicated by a nominal trigger-response delay parameter associated with a downlink TTI of the subframe structure, to enable a response message corresponding to the downlink TTI to be transmitted during the tail portion and before termination of the subframe structure. The operation(s) at block 1620 may be performed using the wireless communication management module 620, 720, 820, or 1250 described with reference to FIG. 6, 7, 8, or 12, or the delay reduction module 845 described with reference to FIG. 8.

Thus, the method 1600 may provide for wireless communication. It should be noted that the method 1600 is just one implementation and that the operations of the method 1600 may be rearranged or otherwise modified such that other implementations are possible.

In some examples, aspects of two or more of the methods 1400, 1500, or 1600 described with reference to FIG. 14, 15, or 16 may be combined.

Figure 17:
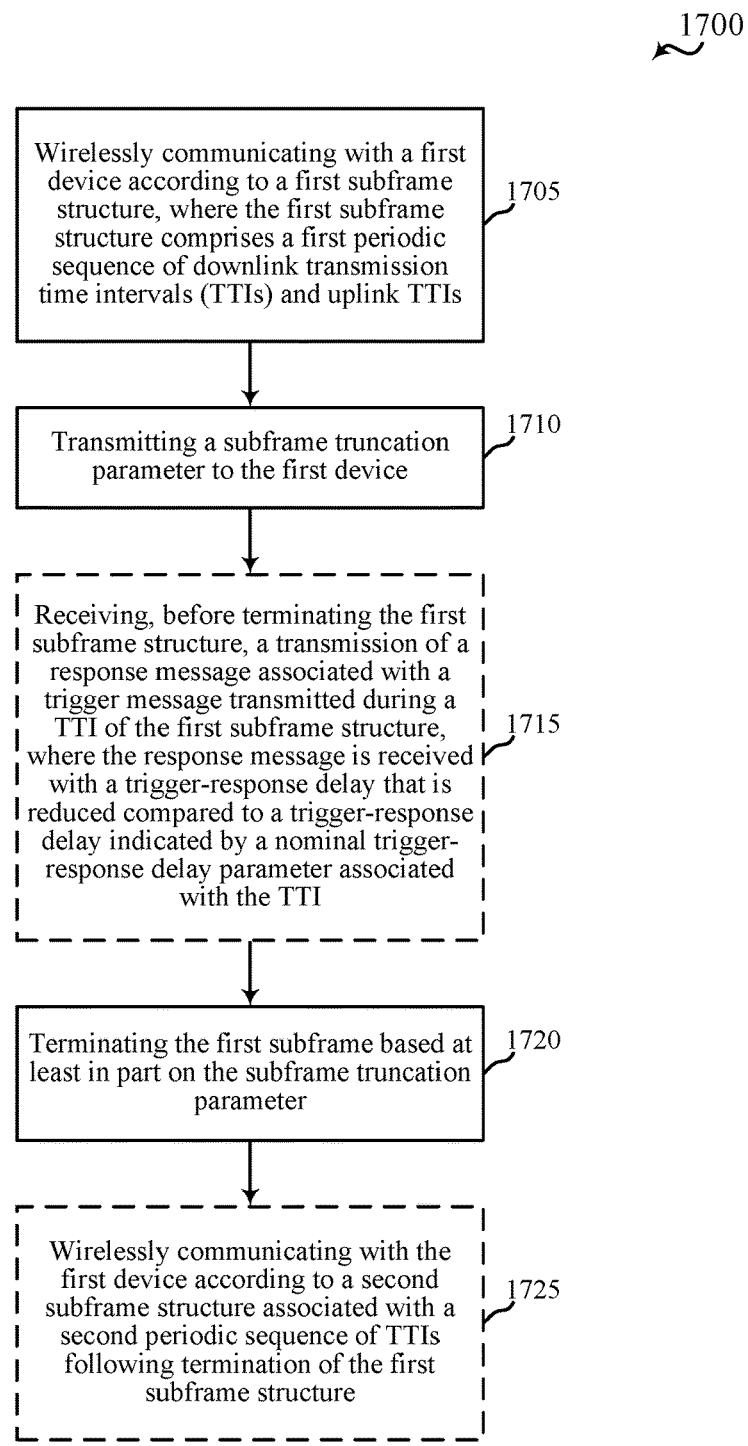
FIG. 17 is a flow chart illustrating an exemplary method of wireless communication at a second device, in accordance with various aspects of the present disclosure.

FIG. 17 is a flow chart illustrating an exemplary method 1700 of wireless communication at a second device, in accordance with various aspects of the present disclosure. For clarity, the method 1700 is described below with reference to a second device having aspects of one or more of the scheduling devices (e.g., base stations 105, Wi-Fi access points 135, or mesh network schedulers) described with reference to FIG. 1, aspects of one or more of the apparatuses 905, 1005, or 1105 described with reference to FIG. 9, 10, or 11, or aspects of the base station 1305 described with reference to FIG. 13. In some examples, a scheduling device or apparatus may execute one or more sets of codes to control the functional elements of the scheduling device or apparatus to perform the functions described below. Additionally or alternatively, the scheduling device or apparatus may perform one or more of the functions described below using special-purpose hardware.

At block 1705, the method 1700 may include wirelessly communicating with a first device (e.g., a UE) according to a first subframe structure. The first subframe structure may include a first periodic sequence of downlink TTIs and uplink TTIs. The operation(s) at block 1705 may be performed using the wireless communication management module 920, 1020, 1120, or 1360 described with reference to FIG. 9, 10, 11, or 13, or the subframe structure management module 935 or 1035 described with reference to FIG. 9 or 10.

In some examples, the first periodic sequence of downlink TTIs and uplink TTIs may include a repeating sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the first periodic sequence may be associated with a nominal trigger-response delay parameter (N) and/or each uplink TTI of the first periodic sequence may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

At block 1710, the method 1700 may include transmitting a subframe truncation parameter to the first device. The subframe truncation parameter may be transmitted, for example, during the first subframe structure. The operation(s) at block 1710 may be performed using the wireless communication management module 920, 1020, 1120, or 1360 described with reference to FIG. 9, 10, 11, or 13, or the subframe structure termination module 940 or 1040 described with reference to FIG. 9 or 10.

In some examples, the subframe truncation parameter may determine a total number of TTIs in the first subframe structure, and may partition the total number of TTIs into an interlaced portion and a tail portion. In some examples, the tail portion may include a one-shot portion.

In some examples, wirelessly communicating with the first device according to the first subframe structure may include transmitting a first trigger message to the first device during a first downlink TTI within the interlaced portion of the first subframe structure. Wirelessly communicating with the first device according to the first subframe structure may also include receiving from the first device, subsequent to transmitting the first trigger message, a first response message associated with the first trigger message. The first response message may be received in an earliest uplink TTI of the first subframe structure that satisfies the nominal trigger-response delay parameter associated with the first downlink TTI. Wirelessly communicating with the first device according to the first subframe structure may further include transmitting a second trigger message to the first device during a second downlink TTI within the tail portion of the first subframe structure. Still further, wirelessly communicating with the second device according to the first subframe structure may include receiving from the first device, subsequent to transmitting the second trigger message, a second response message associated with the second trigger message. The second response message may be received in a last uplink TTI of the first subframe structure.

In some examples, wirelessly communicating with the first device according to the first subframe structure may include receiving a first response message from the first device during a first uplink TTI within the interlaced portion of the first subframe structure. Wirelessly communicating with the first device according to the first subframe structure may also include transmitting to the first device, subsequent to receiving the first response message, a first retrigger message associated with the first response message. The first retrigger message may be transmitted in a downlink TTI of the first subframe structure that satisfies the nominal response-retrigger delay parameter associated with the first uplink TTI. Wirelessly communicating with the first device according to the first subframe structure may further include receiving a second response message from the first device during a second uplink TTI within the tail portion. Still further, wirelessly communicating with the first device according to the first subframe structure may include transmitting to the first device, subsequent to receiving the second response message, a second retrigger message. The second retrigger message may be transmitted in a second subframe structure subsequent to the first subframe structure.

At block 1715, the method 1700 may optionally include receiving, before terminating the first subframe structure at block 1720, a transmission of a response message associated with a trigger message transmitted during a TTI of the first subframe structure, where the response message is received with a first trigger-response delay that is reduced compared to a second trigger-response delay indicated by a nominal trigger-response delay parameter associated with the TTI. The operation(s) at block 1715 may be performed using the wireless communication management module 920, 1020, 1120, or 1360 described with reference to FIG. 9, 10, 11, or 13, or the accelerated response processing module 945 or 1045 described with reference to FIG. 9 or 20.

At block 1720, the method 1700 may include terminating the first subframe structure based at least in part on the subframe truncation parameter. The operation(s) at block 1720 may be performed using the wireless communication management module 920, 1020, 1120, or 1360 described with reference to FIG. 9, 10, 11, or 13, or the subframe structure termination module 940 or 1040 described with reference to FIG. 9 or 10.

At block 1725, the method 1700 may optionally include wirelessly communicating with the first device according to a second subframe structure associated with a second periodic sequence of TTIs following termination of the first subframe structure. In some examples, the first periodic sequence and the second periodic sequence may be a same periodic sequence. In some examples, one of the first periodic sequence and the second periodic sequence may include at least an interlaced portion, and the other of the first periodic sequence and the second periodic sequence may include a one-shot portion. In some examples, both of the first periodic sequence and second periodic sequence may include an interlaced portion and a one-shot portion. The operation(s) at block 1725 may be performed using the wireless communication management module 920, 1020, 1120, or 1360 described with reference to FIG. 9, 10, 11, or 13, or the subframe structure management module 935 or 1035 described with reference to FIG. 9 or 10.

Thus, the method 1700 may provide for wireless communication. It should be noted that the method 1700 is just one implementation and that the operations of the method 1700 may be rearranged or otherwise modified such that other implementations are possible.

Figure 18:
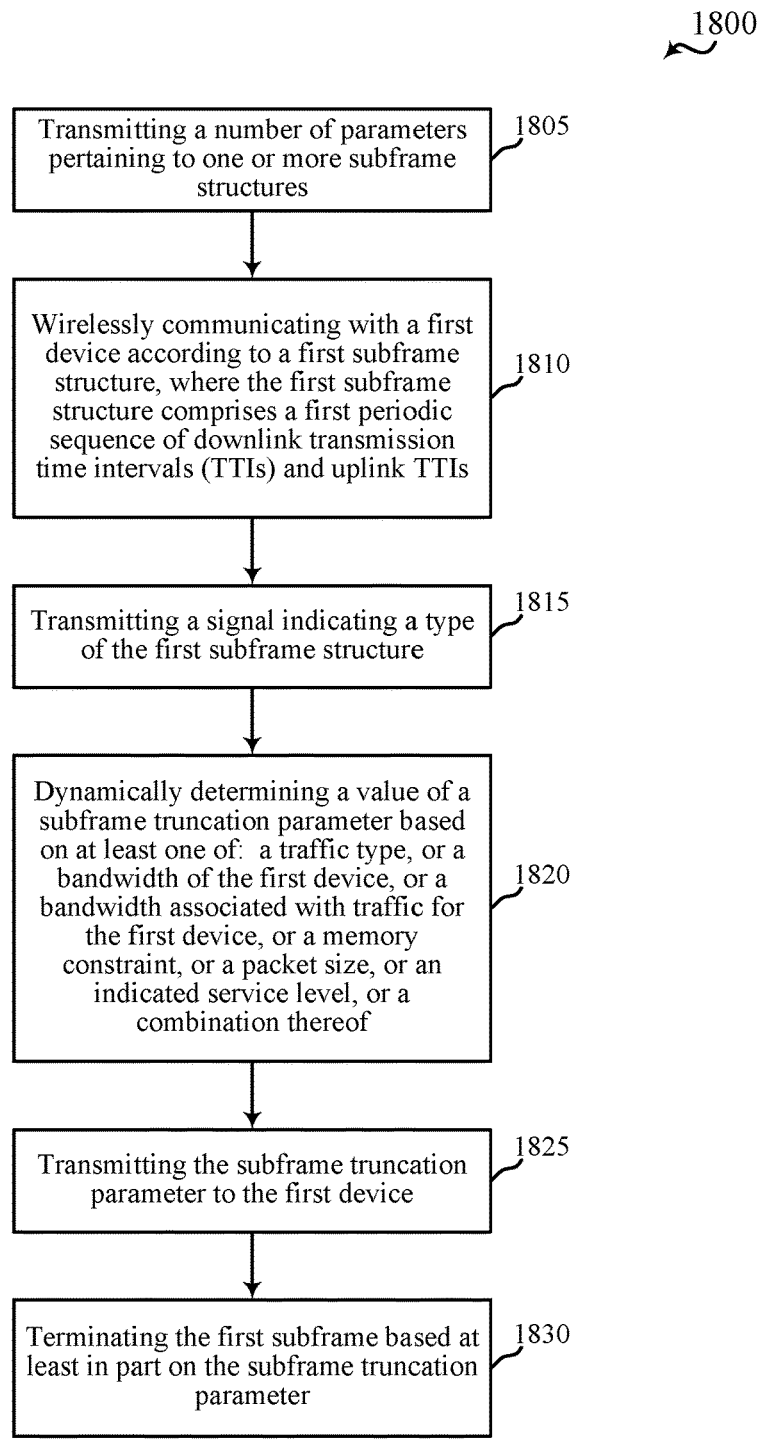
FIG. 18 is a flow chart illustrating an exemplary method of wireless communication at a second device, in accordance with various aspects of the present disclosure.

FIG. 18 is a flow chart illustrating an exemplary method 1800 of wireless communication at a second device, in accordance with various aspects of the present disclosure. For clarity, the method 1800 is described below with reference to a second device having aspects of one or more of the scheduling devices (e.g., base stations 105, Wi-Fi access points 135, or mesh network schedulers) described with reference to FIG. 1, aspects of one or more of the apparatuses 905, 1005, or 1105 described with reference to FIG. 9, 10, or 11, or aspects of the base station 1305 described with reference to FIG. 13. In some examples, a scheduling device or apparatus may execute one or more sets of codes to control the functional elements of the scheduling device or apparatus to perform the functions described below. Additionally or alternatively, the scheduling device or apparatus may perform one or more of the functions described below using special-purpose hardware.

At block 1805, the method 1800 may include transmitting a number of parameters pertaining to one or more subframe structures. In some examples, a parameter in the number of parameters may be transmitted semi-statically as the second device wirelessly communicates with a first device (e.g., a UE), at a frequency less than once per subframe structure; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be transmitted: semi-statically at a frequency less than once per subframe structure, or dynamically at a beginning of each subframe structure.

The operation(s) at block 1805 may be performed using the wireless communication management module 920, 1020, 1120, or 1360 described with reference to FIG. 9, 10, 11, or 13, or the subframe structure parameter notification module 1050 described with reference to FIG. 10.

At block 1810, the method 1800 may include wirelessly communicating with the first device according to a first subframe structure. The first subframe structure may include a first periodic sequence of downlink TTIs and uplink TTIs. The operation(s) at block 1810 may be performed using the wireless communication management module 920, 1020, 1120, or 1360 described with reference to FIG. 9, 10, 11, or 13, or the subframe structure management module 935 or 1035 described with reference to FIG. 9 or 10.

At block 1815, the method 1800 may include transmitting a signal (e.g., a bit) indicating a type of the first subframe structure. In some examples, a signal may be transmitted at a beginning of the first subframe structure indicating which of two or more subframe structures is used for the first subframe structure. In some examples, a bit may be transmitted at a beginning of the first subframe structure indicating whether the first subframe structure follows a configuration of a default subframe structure or a predefined one-shot subframe structure. The operation(s) at block 1815 may be performed using the wireless communication management module 920, 1020, 1120, or 1360 described with reference to FIG. 9, 10, 11, or 13, or the subframe structure type notification module 1055 described with reference to FIG. 10.

At block 1820, the method 1800 may include dynamically determining a value of a subframe truncation parameter. In some examples, the value of the subframe truncation parameter may be based on at least one of: a traffic type, or a first bandwidth of the first device, or a second bandwidth associated with traffic for the first device, or a memory constraint, or a packet size, or an indicated service level, or a combination thereof. The operation(s) at block 1820 may be performed using the wireless communication management module 920, 1020, 1120, or 1360 described with reference to FIG. 9, 10, 11, or 13, or the subframe truncation parameter determination module 1060 described with reference to FIG. 10.

At block 1825, the method 1800 may include transmitting the subframe truncation parameter to the first device. The subframe truncation parameter may be transmitted, for example, during the first subframe structure. In some examples, the subframe truncation parameter may be transmitted during a dynamically determined TTI of the first subframe structure, which dynamically determined TTI occurs before commencing terminating the first subframe structure. In some examples, the subframe truncation parameter may be transmitted during a predetermined TTI of the first subframe structure. The operation(s) at block 1825 may be performed using the wireless communication management module 920, 1020, 1120, or 1360 described with reference to FIG. 9, 10, 11, or 13, or the subframe structure termination module 940 or 1040 described with reference to FIG. 9 or 10.

In some examples, the subframe truncation parameter may determine a total number of TTIs in the first subframe structure and may partition the total number of TTIs into an interlaced portion and a tail portion. In some examples, the tail portion may include a one-shot portion.

At block 1830, the method 1800 may include terminating the first subframe structure based at least in part on the subframe truncation parameter. The operation(s) at block 1830 may be performed using the wireless communication management module 920, 1020, 1120, or 1360 described with reference to FIG. 9, 10, 11, or 13, or the subframe structure termination module 940 or 1040 described with reference to FIG. 9 or 10.

Thus, the method 1800 may provide for wireless communication. It should be noted that the method 1800 is just one implementation and that the operations of the method 1800 may be rearranged or otherwise modified such that other implementations are possible.

Figure 19:
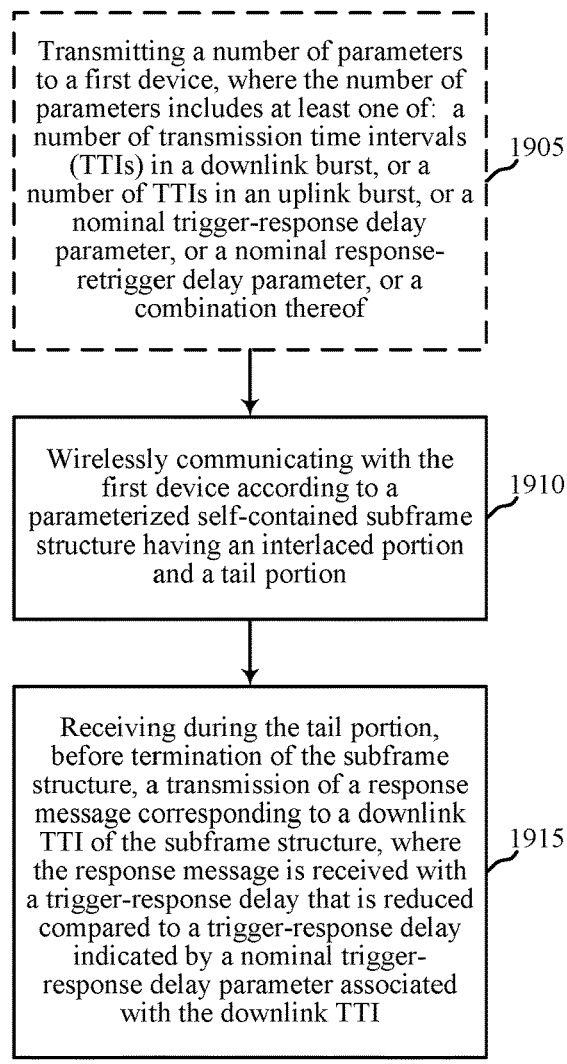
FIG. 19 is a flow chart illustrating an exemplary method of wireless communication at a second device, in accordance with various aspects of the present disclosure.

FIG. 19 is a flow chart illustrating an exemplary method 1900 of wireless communication at a second device, in accordance with various aspects of the present disclosure. For clarity, the method 1900 is described below with reference to a second device having aspects of one or more of the scheduling devices (e.g., base stations 105, Wi-Fi access points 135, or mesh network schedulers) described with reference to FIG. 1, aspects of one or more of the apparatuses 905, 1005, or 1105 described with reference to FIG. 9, 10, or 11, or aspects of the base station 1305 described with reference to FIG. 13. In some examples, a scheduling device or apparatus may execute one or more sets of codes to control the functional elements of the scheduling device or apparatus to perform the functions described below. Additionally or alternatively, the scheduling device or apparatus may perform one or more of the functions described below using special-purpose hardware.

At block 1905, the method 1900 may optionally include transmitting a number of parameters pertaining to one or more subframe structures. In some examples, a parameter in the number of parameters may be transmitted semi-statically as the second device wirelessly communicates with a first device (e.g., a UE), at a frequency less than once per subframe; or dynamically during each subframe structure. In some examples, the number of parameters may define a configuration of a default subframe structure. In some examples, the number of parameters may define two or more subframe structures. In some examples, the number of parameters may define a portion of a subframe structure (e.g., an interlaced portion of a subframe structure).

In some examples, the number of parameters may include at least one of: a number of TTIs in a downlink burst (M), or a number of TTIs in an uplink burst (M'), or a nominal trigger-response delay parameter (N), or a nominal response-retrigger delay parameter (N'), or a combination thereof. In some examples, a parameter in the number of parameters may be transmitted: semi-statically at a frequency less than once per subframe structure, or dynamically at a beginning of each subframe structure.

The operation(s) at block 1905 may be performed using the wireless communication management module 920, 1020, 1120, or 1360 described with reference to FIG. 9, 10, 11, or 13, or the subframe structure parameter notification module 1140 described with reference to FIG. 11.

At block 1910, the method 1900 may include wirelessly communicating with the first device according to a parameterized self-contained subframe structure having an interlaced portion and a tail portion. In some examples, the tail portion may include a one-shot portion. The first subframe structure may include a periodic sequence of downlink TTIs and uplink TTIs. The operation(s) at block 1910 may be performed using the wireless communication management module 920, 1020, 1120, or 1360 described with reference to FIG. 9, 10, 11, or 13, or the subframe structure management module 1135 described with reference to FIG. 11.

In some examples, the subframe structure may include a sequence of downlink bursts and uplink bursts, where each downlink burst includes a first set of one or more downlink TTIs and each uplink burst includes a second set of one or more uplink TTIs. In some examples, at least some of the uplink bursts and downlink bursts may be separated by GT intervals.

In some examples, each downlink TTI of the subframe structure may be associated with a nominal trigger-response delay parameter (N) and/or each uplink TTI of the subframe structure may be associated with a nominal response-retrigger delay parameter (N'). The nominal trigger-response delay parameter associated with a downlink TTI may be a periodic function of a TTI index associated with the downlink TTI, and/or the nominal response-retrigger delay parameter associated with an uplink TTI may be a periodic function of a TTI index associated with the uplink TTI.

At block 1915, the method 1900 may include receiving, during the tail portion and before termination of the subframe structure, a transmission of a response message corresponding to a downlink TTI of the subframe structure, where the response message is received with a first trigger-response delay that is reduced compared to a second trigger-response delay indicated by a nominal trigger-response delay parameter associated with the downlink TTI. The operation(s) at block 1915 may be performed using the wireless communication management module 920, 1020, 1120, or 1360 described with reference to FIG. 9, 10, 11, or 13, or the accelerated response processing module 1145 described with reference to FIG. 11.

Thus, the method 1900 may provide for wireless communication. It should be noted that the method 1900 is just one implementation and that the operations of the method 1900 may be rearranged or otherwise modified such that other implementations are possible.

In some examples, aspects of two or more of the methods 1700, 1800, or 1900 described with reference to FIG. 17, 18, or 19 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a first device, comprising:
wirelessly communicating with a second device according to a first subframe structure, wherein the first subframe structure comprises a first periodic sequence of downlink transmission time intervals (TTIs) and uplink TTIs;
receiving a subframe truncation parameter from the second device, wherein the subframe truncation parameter indicates a total number of TTIs in the first subframe structure and partitions the total number of TTIs into an interlaced portion and a tail portion;
receiving a plurality of trigger messages from the second device during the downlink TTIs;
transmitting a plurality of response messages associated with the trigger messages during the uplink TTIs; and
terminating the first subframe structure based at least in part on the subframe truncation parameter wherein the first subframe structure terminates by truncating an uplink burst of a plurality of uplink TTIs into a last uplink TTI, and wherein during which a response message associated with outstanding trigger messages is transmitted in the last uplink TTI.

2. The method of claim 1, wherein each downlink TTI of the first periodic sequence is associated with a nominal trigger-response delay parameter which is a function of a TTI index associated with the downlink TTI.

3. The method of claim 2, wherein each uplink TTI of the first periodic sequence is associated with a nominal response-retrigger delay parameter which is a function of a TTI index associated with the downlink TTI.

4. The method of claim 3, further comprising:
overriding the nominal trigger-response delay parameter or the nominal response-retrigger delay parameter associated with a TTI of the first subframe structure based at least in part on the subframe truncation parameter, wherein overriding the nominal trigger-response delay parameter comprises:
reducing a delay indicated by the nominal trigger-response delay parameter to enable transmission of a response message before termination of the first subframe structure.

5. The method of claim 1, wherein the tail portion comprises a one-shot portion.

6. The method of claim 1, wherein wirelessly communicating with the second device according to the first subframe structure comprises:
receiving a first trigger message from the second device during a first downlink TTI within the interlaced portion or a second trigger message from the second device during a second downlink TTI within the tail portion; and
transmitting to the second device, subsequent to receiving the first trigger message or the second trigger message, a first response message associated with the first trigger message, wherein the first response message is transmitted in an earliest uplink TTI of the first subframe structure that satisfies a nominal trigger-response delay parameter associated with the first downlink TTI, or a second response message associated with the second trigger message, wherein the second response message is transmitted in the last uplink TTI of the first subframe structure.

7. The method of claim 1, further comprising:
wirelessly communicating with the second device according to a second subframe structure associated with a second periodic sequence of TTIs following termination of the first subframe structure, wherein the first periodic sequence of downlink TTIs and uplink TTIs comprises a repeating sequence of downlink bursts and uplink bursts, wherein each downlink burst comprises a first set of one or more downlink TTIs and each uplink burst comprises a second set of one or more uplink TTIs.

8. The method of claim 1, further comprising:
receiving a number of parameters from the second device, wherein the number of parameters comprises at least one of: a first number of TTIs in a downlink burst, or a second number of TTIs in an uplink burst, or a nominal trigger-response delay parameter, or a nominal response-retrigger delay parameter, or a combination thereof.

9. The method of claim 1, further comprising:
receiving, semi-statically at a frequency less than once per subframe, a number of parameters defining a configuration of a default subframe structure; and
receiving a bit at a beginning of the first subframe structure indicating whether the first subframe structure follows the configuration of the default subframe structure or a configuration of a predefined one-shot subframe structure.

10. The method of claim 1, wherein the subframe truncation parameter is received during the first subframe structure.

11. An apparatus for wireless communication at a first device, comprising:
a processor; and
memory coupled to the processor, wherein the processor is configured to:
wirelessly communicate with a second device according to a first subframe structure, wherein the first subframe structure comprises a first periodic sequence of downlink transmission time intervals (TTIs) and uplink TTIs;
receive a subframe truncation parameter from the second device, wherein the subframe truncation parameter indicates a total number of TTIs in the first subframe structure and partitions the total number of TTIs into an interlaced portion and a tail portion;
receive a plurality of trigger messages from the second device during the downlink TTIs;
transmit a plurality of response messages associated with the trigger messages during uplink TTIs; and
terminate the first subframe structure based at least in part on the subframe truncation parameter, wherein the first subframe structure terminates by truncating an uplink burst a plurality of uplink TTIs into a last uplink TTI, and wherein a response message associated with outstanding trigger messages is transmitted in the last uplink TTI.

12. The apparatus of claim 11, wherein each downlink TTI of the first periodic sequence is associated with a nominal trigger-response delay parameter which is a function of a TTI index associated with the downlink TTI.

13. The apparatus of claim 12, wherein the processor configured to wirelessly communicate with the second device according to the first subframe structure is further configured to:
receive a first trigger message from the second device during a first downlink TTI within the interlaced portion or a second trigger message from the second device during a second downlink TTI within the tail portion; and transmit to the second device, subsequent to receiving the first trigger message or the second trigger message, a first response message associated with the first trigger message, wherein the first response message is transmitted in an earliest uplink TTI of the first subframe structure that satisfies the nominal trigger-response delay parameter associated with the first downlink TTI, or a second response message associated with the second trigger message, wherein the second response message is transmitted in the last uplink TTI of the first subframe structure.

14. The apparatus of claim 11, wherein the processor is further configured to:

receive, semi-statically at a frequency less than once per subframe, a number of parameters defining a configuration of a default subframe structure; and receive a bit at a beginning of the first subframe structure indicating whether the first subframe structure follows the configuration of the default subframe structure or a configuration of a predefined one-shot subframe structure.

15. A method of wireless communication at a second device, comprising:

wirelessly communicating with a first device according to a first subframe structure, wherein the first subframe structure comprises a first periodic sequence of downlink transmission time intervals (TTIs) and uplink TTIs;

transmitting a subframe truncation parameter to the first device, wherein the subframe truncation parameter indicates a total number of TTIs in the first subframe structure and partitions the total number of TTIs into an interlaced portion and a tail portion;

transmitting a plurality of trigger messages during the downlink TTIs;

receiving a plurality of response messages associated with the trigger messages during uplink TTIs; and receiving a response message associated with outstanding trigger messages in a last uplink TTI of the first subframe structure, wherein the first subframe structure terminates by truncating an uplink burst of a plurality of uplink TTIs into the last uplink TTI based at least in part on the subframe truncation parameter.

16. The method of claim 15, wherein the first periodic sequence of downlink TTIs and uplink TTIs comprises a repeating sequence of downlink bursts and uplink bursts, wherein each downlink burst comprises a first set of one or more downlink TTIs and each uplink burst comprises a second set of one or more uplink TTIs.

17. The method of claim 15, further comprising:

receiving, before terminating the first subframe structure, a transmission of a response message associated with a trigger message transmitted during a TTI of the first subframe structure, wherein the response message is received with a first trigger-response delay that is reduced compared to a second trigger-response delay indicated by a nominal trigger-response delay parameter associated with the TTI.

18. The method of claim 15, wherein the tail portion comprises a one-shot portion.

19. The method of claim 15, further comprising:

transmitting a number of parameters to the first device, wherein the number of parameters comprises at least one of: a first number of TTIs in a downlink burst, or a second number of TTIs in an uplink burst, or a nominal trigger-response delay parameter, or a nominal response-retrigger delay parameter, or a combination thereof.

20. The method of claim 15, wherein the subframe truncation parameter is transmitted during the first subframe structure.

21. The method of claim 20, wherein the subframe truncation parameter is transmitted:

during a predetermined TTI of the first subframe structure, or during a dynamically determined TTI of the first subframe structure, the dynamically determined TTI occurring before commencing terminating the first subframe structure.

22. The method of claim 15, further comprising:

dynamically determining a value of the subframe truncation parameter based on at least one of: a traffic type, or a first bandwidth of the first device, or a second bandwidth associated with traffic for the first device, or a memory constraint, or a packet size, or an indicated service level, or a combination thereof.

23. An apparatus for wireless communication at a second device, comprising:

a processor; and memory coupled to the processor, wherein the processor is configured to:

wirelessly communicate with a first device according to a first subframe structure, wherein the first subframe structure comprises a first periodic sequence of downlink transmission time intervals (TTIs) and uplink TTIs;

transmit a subframe truncation parameter to the first device, wherein the subframe truncation parameter indicates a total number of TTIs in the first subframe structure and partitions the total number of TTIs into an interlaced portion and a tail portion;

transmit a plurality of trigger messages during the downlink TTIs;

receive a plurality of response messages associated with the trigger messages during uplink TTIs; and receive a response message associated with outstanding trigger messages in a last uplink TTI of the first subframe structure, wherein the first subframe structure terminates by truncating an uplink burst of a plurality of uplink TTIs into the last uplink TTI based at least in part on the subframe truncation parameter.

24. The apparatus of claim 23, wherein the first periodic sequence of downlink TTIs and uplink TTIs comprises a repeating sequence of downlink bursts and uplink bursts, wherein each downlink burst comprises a first set of one or more downlink TTIs and each uplink burst comprises a second set of one or more uplink TTIs.

25. The apparatus of claim 23, wherein the processor is further configured to:

receive, before terminating the first subframe structure, a transmission of a response message associated with a trigger message transmitted during a TTI of the first subframe structure, wherein the response message is received with a first trigger-response delay that is reduced compared to a second trigger-response delay indicated by a nominal trigger-response delay parameter associated with the TTI.

26. The apparatus of claim 23, wherein the subframe truncation parameter is transmitted:

during a predetermined TTI of the first subframe structure, or during a dynamically determined TTI of the first subframe structure, the dynamically determined TTI occurring before commencing terminating the first subframe structure.

27. The apparatus of claim 23, wherein the processor is further configured to:
dynamically determine a value of the subframe truncation parameter based on at least one of: a traffic type, or a first bandwidth of the first device, or a second bandwidth associated with traffic for the first device, or a memory constraint, or a packet size, or an indicated service level, or a combination thereof.

* * * * *